Aug. 16, 1966     H. A. DOOLITTLE     3,267,279
LENS AND LENS ASSEMBLIES
Filed April 1, 1965     11 Sheets-Sheet 1
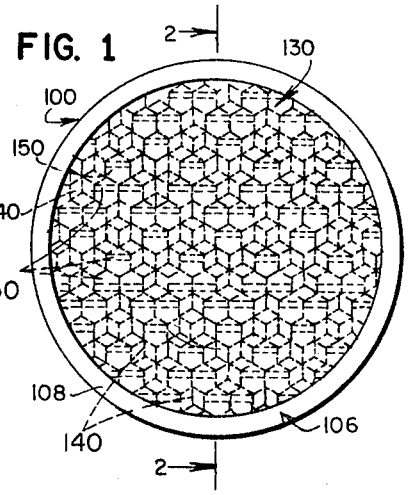
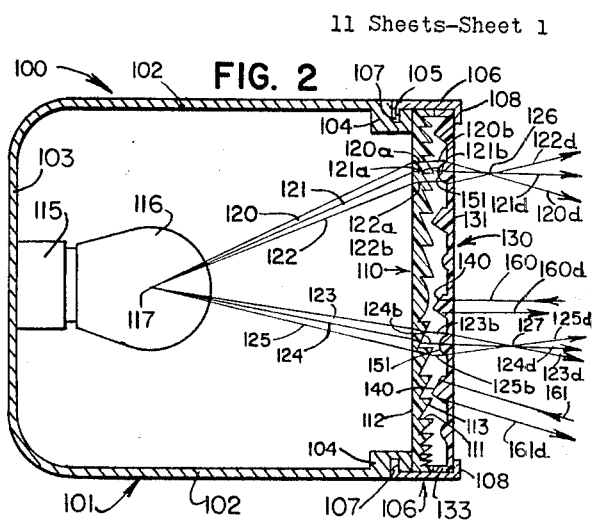
Inventor
HAROLD A. DOOLITTLE
By
Prangley, Baird, Clayton, Miller & Vogel.
Attys.

Aug. 16, 1966 H. A. DOOLITTLE 3,267,279
LENS AND LENS ASSEMBLIES
Filed April 1, 1965 11 Sheets-Sheet 2

Aug. 16, 1966      H. A. DOOLITTLE      3,267,279
LENS AND LENS ASSEMBLIES
Filed April 1, 1965      11 Sheets-Sheet 4
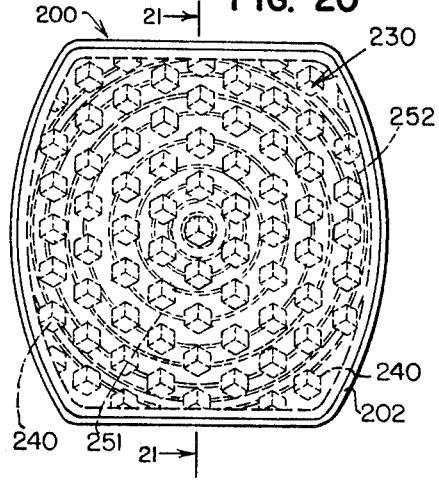
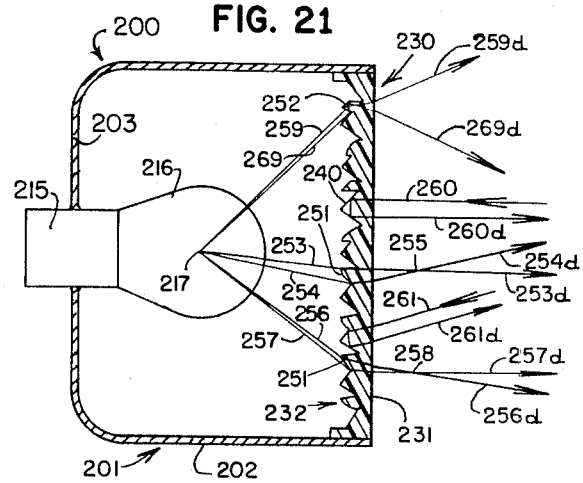
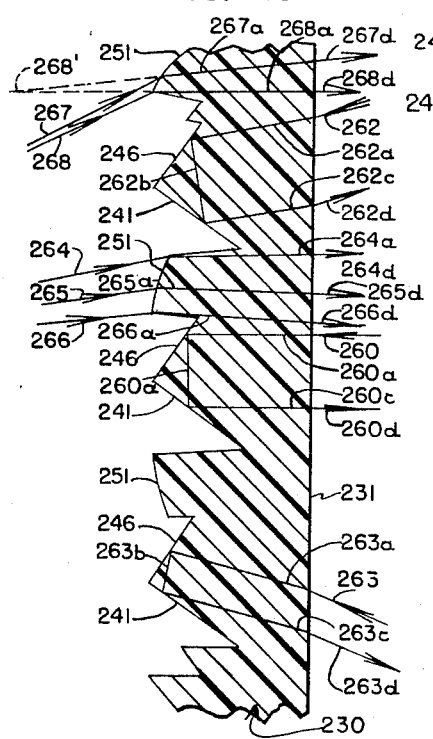
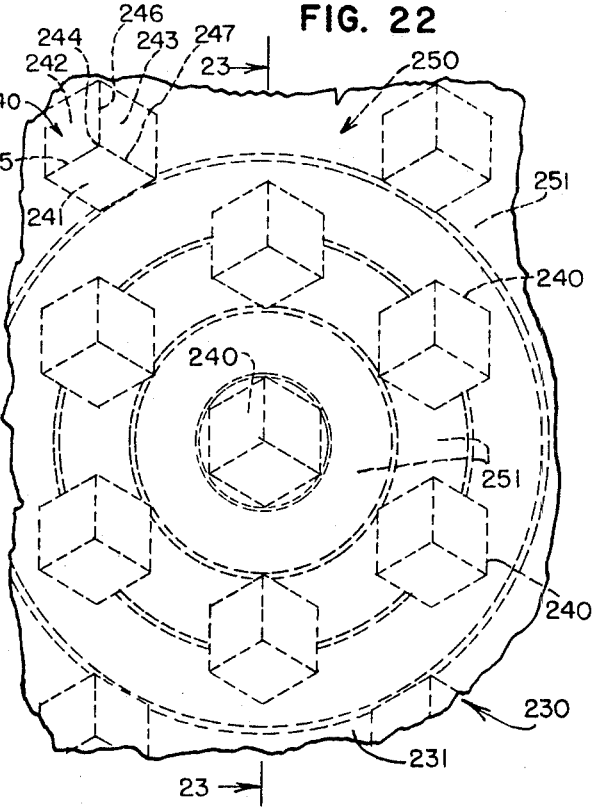

Aug. 16, 1966  H. A. DOOLITTLE  3,267,279
LENS AND LENS ASSEMBLIES
Filed April 1, 1965  11 Sheets-Sheet 5
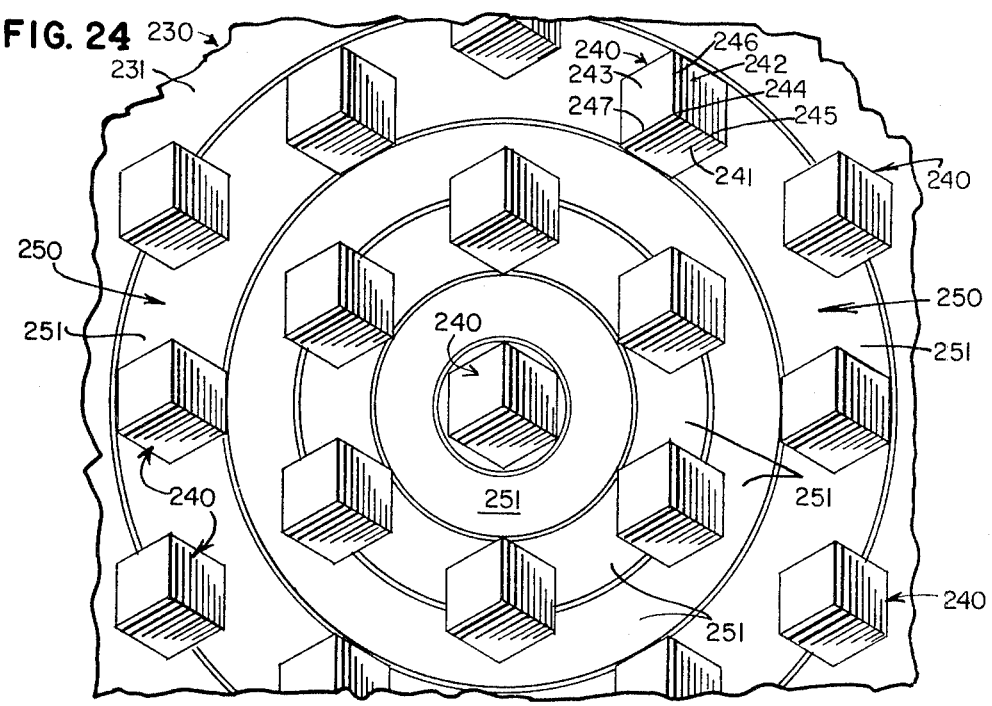
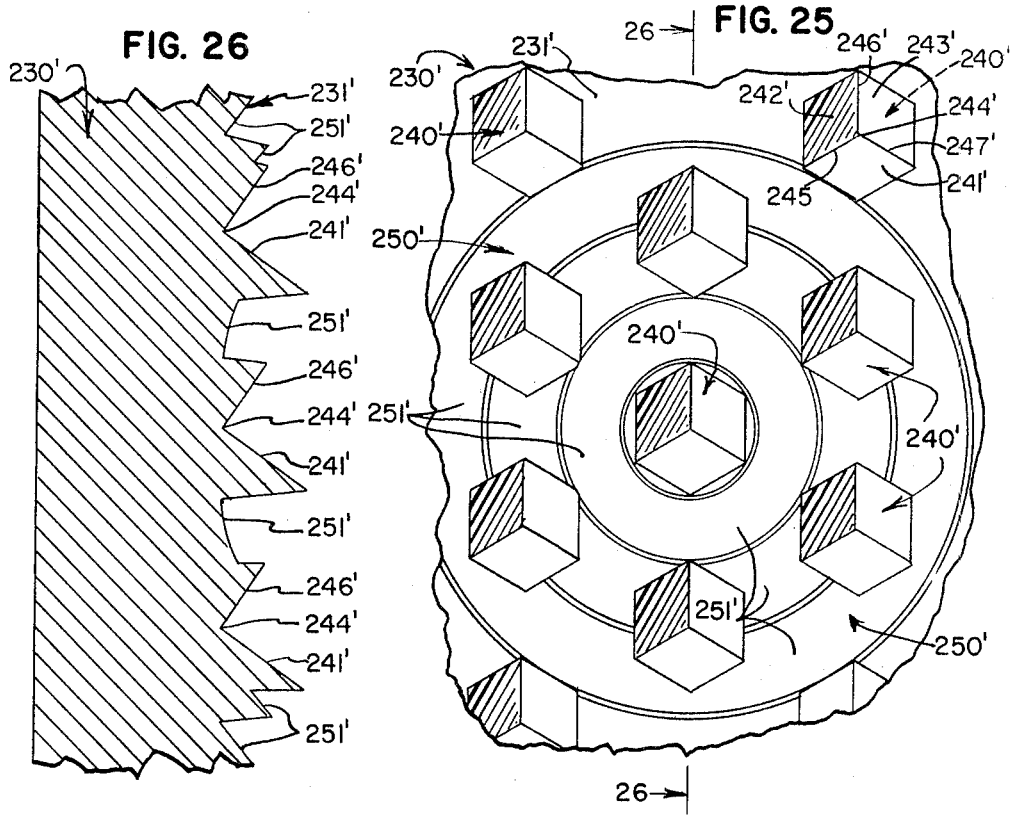

Aug. 16, 1966 H. A. DOOLITTLE 3,267,279
LENS AND LENS ASSEMBLIES
Filed April 1, 1965 11 Sheets-Sheet 6

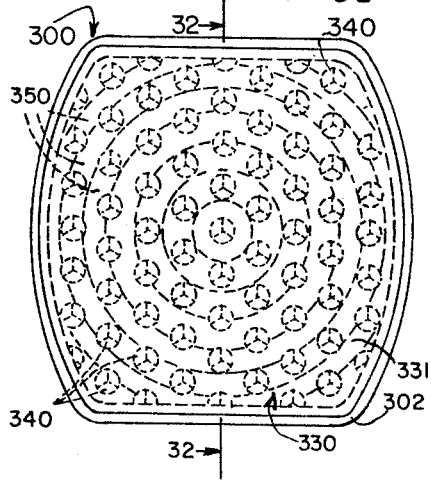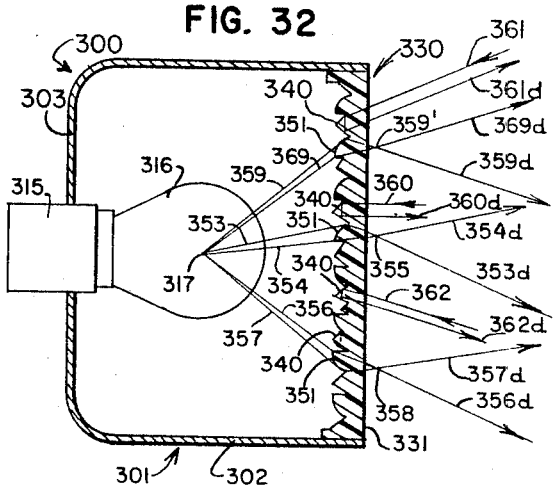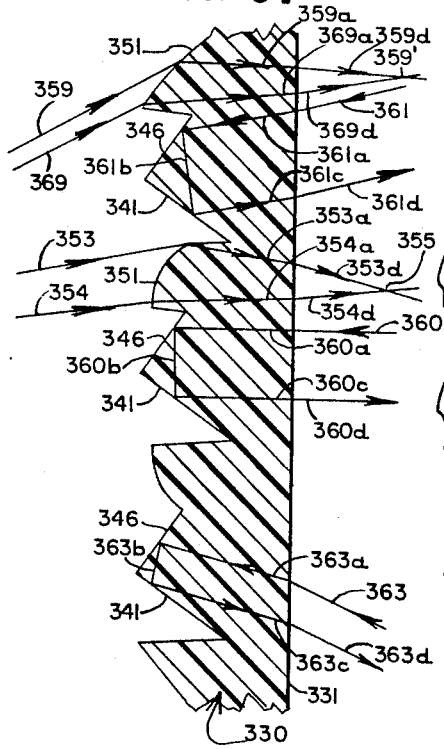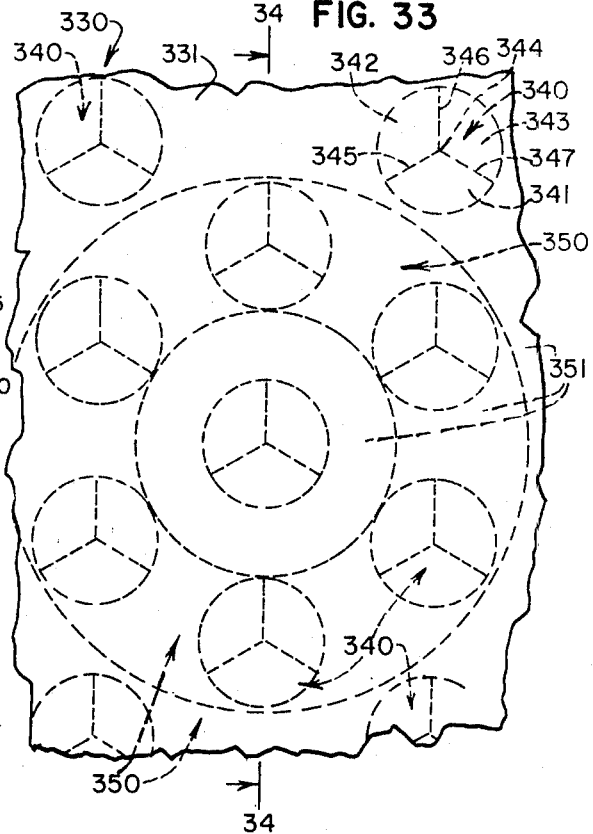

Aug. 16, 1966  H. A. DOOLITTLE  3,267,279
LENS AND LENS ASSEMBLIES
Filed April 1, 1965  11 Sheets-Sheet 10

United States Patent Office 3,267,279
Patented August 16, 1966

3,267,279
LENS AND LENS ASSEMBLIES
Harold A. Doolittle, Park Ridge, Ill., assignor to Elastic Stop Nut Corporation of America, Union, N.J., a corporation of New Jersey
Filed Apr. 1, 1965, Ser. No. 444,768
23 Claims. (Cl. 240—41.3)

This application is a continuation-in-part of the copending application for United States Letters Patent of Harold A. Doolittle, Serial No. 151,996, filed November 13, 1961, now abandoned.

The present invention relates to lenses, and to light assemblies incorporating the lenses therein, and to molding elements and molding methods for forming the lenses.

There is a substantial demand, for example in the automotive lens field and in the barricade lens field, for lenses that are both capable of reflecting light from an external source back toward the external source, and capable of focusing and/or directing light from a source behind the lens into a predetermined pattern in front of the lens. Prior to the present invention, it was deemed necessary to devote one contiguous but separate area of the lens to the reflecting function and another contiguous but separate area of the lens to the focusing function. For example, in automotive tail light, it is customary to form either a "bullseye" of retrodirective reflector elements in the center of the lens surrounded by light focusing optic elements extending to the periphery of the lens, or a border of retrodirective reflector elements around light focusing optic elements disposed in the center of the lens. Accordingly, if the conditions of use of the lens required six square inches of effective reflector area and six square inches of effective optic area, then the total area of the lens was of necessity at least twelve square inches. In addition, the lens had one visual shape or configuration when viewed in daylight, another visual shape or configuration when illuminated at night by incident light reflected therefrom, and yet another visual shape or configuration when illuminated at night by transmitted light from a light source to the rear thereof.

It is a general object of the present invention to provide an improved lens of the type set forth which presents the same shape and geometric configuration to the eye when viewed in daylight, when illuminated at night by incident light reflected therefrom, and when illuminated at night by transmitted light from a light source to the rear thereof.

Another object of the invention is to provide an improved lens of the type set forth including an optic system area and a plurality of retrodirective reflector areas that are superimposed and congruent, whereby the congruent area presents to the eye of an observer the same shape both when lighted by light falling on the rear face thereof and when lighted by light falling on the front face thereof.

Yet another object of the invention is to provide an improved lens of the type set forth wherein the congruent area thereof includes both an optic system and retrodirective reflector elements substantially uniformly distributed and intermingled throughout the area thereof, the adjacent ones of the reflector elements as viewed in the front face having major dimensions and being spaced apart a distance no greater than about 0.175 inch, whereby the congruent area when viewed at a distance of about 50 feet appears uniformly lighted throughout and of the same shape both when lighted by light falling on the rear face thereof and when lighted by light falling on the front face thereof.

Still another object of the invention is to provide an improved lens of the type set forth wherein the reflector elements are all of the full cube corner type.

Yet another object of the invention is to provide an improved lens of the type set forth wherein the congruent area is composed of a plurality of juxtaposed areas of regular geometric shape, such as a hexagonal shape, certain of the areas of regular geometric shape combining to form an optic system and the other of the areas of regular geometric shape forming reflector elements.

Another object of the invention is to provide an improved lens of the type set forth wherein the congruent area is composed of a light focusing optic system of a regular geometric pattern or design substantially covering the congruent area, and a plurality of retrodirective reflector elements substantially uniformly distributed throughout the optic system in the congruent area.

In connection with the foregoing object, another object of the invention is to provide an improved lens of the type set forth wherein the optic system is formed of a plurality of juxtaposed areas of regular geometric shape, such as a hexagonal shape, and providing an optic system of regular geometric design such as a concentric ring optic system.

Still another object of the invention is to provide an improved lens of the type set forth wherein the congruent area includes a light focusing optic system of regular geometric design covering the congruent area and having uniformly distributed therethrough retrodirective reflector elements that are circular in shape as viewed in a direction substantially normal to the lens faces.

A further object of the invention is to provide improved light assemblies incorporating therein the improved lenses of the type set forth above.

A still further object of the invention is to provide improved molding elements including improved pins and improved master tools together with improved molding methods and improved methods of forming the master tools for making improved lenses of the type set forth above.

Further features of the invention pertain to the particular arrangement of the parts of the lens and the light assemblies and the molding elements, and to the particular arrangement of the steps of the methods, whereby the above-outlined and additional operating features thereof are attained.

The invention, both as to its organization and method of operation, together with further objects and advantages thereof, will best be understood by reference to the following specification taken in connection with the accompanying drawings, in which:

FIGURE 1 is a front elevational view on an enlarged scale of a light assembly incorporating therein a lens made in accordance with and embodying the principles of the present invention;

FIG. 2 is a view in vertical section through the light assembly of FIG. 1 along the line 2—2 thereof;

FIG. 3 is a further enlarged front elevational view of a portion of the lens of FIG. 1 illustrating additional details thereof;

FIG. 4 is a view in vertical section through the lens of FIG. 3 along the line 4—4 thereof and also showing in section the associated portion of a collimating lens used therewith;

FIG. 20 is a front elevational view on an enlarged scale of a second form of light assembly incorporating therein a second form of a lens made in accordance with and embodying the principles of the present invention;

FIG. 21 is a view in vertical section through the light assembly of FIG. 20 along the line 21—21 thereof;

FIG. 22 is a further enlarged front elevational view of a portion of the lens of FIG. 20 illustrating additional details thereof;

FIG. 23 is a view in vertical section through the lens of FIG. 22 along the line 23—23 thereof;

FIG. 24 is an elevational view of the rear face of the portion of the lens illustrated in FIG. 22;

FIG. 25 is an elevational view of a portion of the mold against which the rear face of the lens in FIG. 24 was molded;

FIG. 26 is a view in vertical section through the mold of FIG. 25 along the line 26—26 thereof;

FIG. 31 is a front elevational view on an enlarged scale of a third form of light assembly incorporating therein a third form of a lens made in accordance with and embodying the principles of the present invention;

FIG. 32 is a view in vertical section through the light assembly of FIG. 31 along the line 32—32 thereof;

FIG. 33 is a further enlarged front elevational view of a portion of the lens of FIG. 31 illustrating additional details thereof;

FIG. 34 is a view in vertical section through the lens of of FIG. 33 along the line 34—34 thereof;

Figure 5:
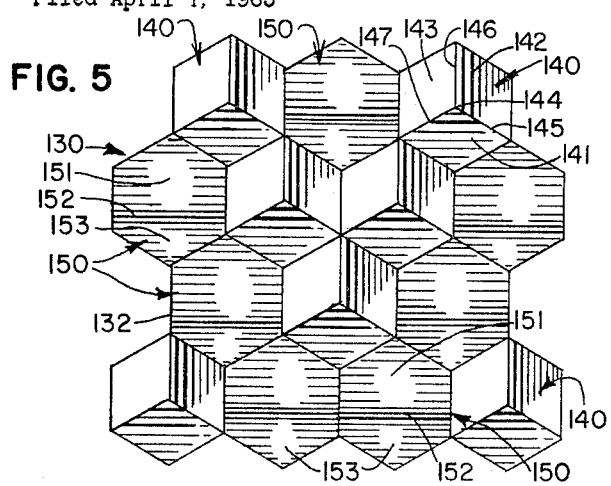
FIG. 5 is an elevational view of the rear face of the portion of the lens illustrated in FIG. 3.

Referring to FIGS. 1 and 2 of the drawings there is illustrated a light assembly 100 in the form of a signal light, such as a railway signal light, made in accordance with and embodying the principles of the present invention, the light assembly 100 having a generally circular shape as seen in FIG. 1. Referring to FIG. 2, it will be seen that the light assembly 100 includes a housing 101 having a generally cylindrical side wall 102 closed at one end thereof by a rear wall 103. The forward or right-hand end of the side wall 102 carries an inwardly directed annular flange 104 which has formed in the outer periphery thereof a slot 105 extending around the housing 101. A retaining ring 106 is provided including a first flange 107 disposed in the slot 105 to mount the ring 106 on the housing 102 and a second flange 108 disposed forwardly or to the right in FIG. 2 and serving to clamp on the forward end of the housing 101 a collimating lens 110 and a light focusing and reflecting lens 130 made in accordance with and embodying the principles of the present invention.

Mounted on the housing 101 and specifically on the rear wall 103 generally centrally thereof is a lamp socket 115 having portions (not shown) extending outwardly beyond the housing 101 and carrying electrical connections (not shown) for attachment to a suitable electrical system. Mounted in the lamp socket 115 is an electric lamp 116 including therein a light source at 117 such as a filament of tungsten wire which can be heated to incandescence to cause light to radiate therefrom.

The light source 117 is mounted generally centrally of the vertical cross section in the housing 101 and generally centrally and on the axis of the lenses 110 and 130. Light issuing from the source 117 may be directed generally forwardly and upwardly as illustrated by the light rays 120, 121 and 122 or may be directed generally forwardly and downwardly as illustrated by the light rays 123, 124 and 125, all of the light rays diverging from the source 117. The purpose of the collimating lens 110 is to convert the diverging light rays 120 through 125 into parallel rays of light to be applied to the rear face of the lens 130. To this end the collimating lens 110 is provided with an optic system generally designated by the numeral 111 and including as illustrated a plurality of concentric dioptic rings which serve to convert the diverging rays of light striking the rear face 112 thereof into parallel rays of light leaving the front face 113 thereof after being acted upon by and passing through the optic system 111. As illustrated, the collimating lens 110 is preferably formed of a synthetic organic plastic resin, the preferred resin being methyl methacrylate resin, a body of the resin being molded as illustrated to provide a substantially flat rear face 112, and a configured front face 113 carrying the optic system 111 thereon, the periphery of the lens 110 being generally circular and having the same diameter as the lens 130. In the operation of the lens 110, the light rays 120, 121 and 122 striking the rear face 112 thereof are refracted to provide rays 120a, 121a and 122a, respectively, which again are refracted upon passing through the front face 113 into parallel light rays 120b, 121b and 122b that are directed upon the rear face of the lens 130. The light rays 123, 124 and 125 are likewise converted into parallel rays 123b, 124b and 125b for application to and directing upon the rear face of the lens 130.

As has been described above, the lens 130 is mounted upon the forward portion of the housing 101 and in front of the collimating lens 110. As illustrated, the lens 130 is formed of a synthetic organic plastic resin, the preferred resin being methyl methacrylate resin, a body of the resin being molded as illustrated to provide a substantially flat front face 131, a configurated rear face 132, and a mounting flange 133 generally cylindrical in shape and extending rearwardly from the circular outer periphery of the lens 130. Means is also preferably provided to form a fluidtight and airtight seal between the mounting ring 106 and the lens 130 so as to seal from the atmosphere the volume enclosed by the rear of the housing 101 and the rear face 132 of the lens 130.

The signal light 100 must serve at night as a reflector for light from approaching vehicles, such as the headlights of a following automobile or the headlight of a railway locomotive, or the like, and to this end there is provided throughout the area of the lens 130 a plurality of reflector elements 140, the reflector elements 140 being of the retrodirective type and specifically of the full cube corner type. Referring particularly to FIGS. 3, 4 and 5, each of the reflector elements 140 includes three reflecting surfaces 141, 142 and 143 disposed mutually perpendicular one to the other and joining at a rear corner 144 and along edges 145, 146 and 147 extending forwardly from the corner 144; more particularly, the edge 145 is disposed between the reflecting surfaces 141 and 142, the edge 146 is disposed between the reflecting surfaces 142 and 143, and the edge 147 is disposed between the reflecting surfaces 141 and 143. As viewed in FIGS. 3 and 5, each of the reflector elements 140 is in the form of a hexagon, the corner 144 extending outwardly from the paper in FIG. 5 and extending inwardly into the paper in FIG. 3. It will be seen that the reflector elements 140 are distributed throughout the area of the lens 130 bounded by the flange 106, approximately 50% of the bounded area being occupied by the reflector elements 140 as seen in FIGS. 3 and 5.

The manner in which the reflector elements 140 operate to reflect incident light falling upon the front face 131 back toward the source of the incident light is illustrated in FIGS. 2 and 4. In the central portion of FIG. 2, an incident light ray 160 substantially perpendicular to the front face 131 has been shown as passing into the body of the lens 130 without refraction and being internally reflected from the faces of a reflector element 140 and exiting therefrom as at 160d back toward the source of the incident ray 160. In the lower portion of FIG. 2, an incident ray 161 striking the front face 131 from below and at an acute angle is refracted upon entering the body of the lens 130 and is also internally reflected from the surfaces of a reflector element 140 and exits as a ray 161d directed toward the source of the incident ray 161.

Referring to FIG. 4, it will further be seen that an incident ray 162 also striking the front face 131 at an acute angle, but from above, is refracted upon entering the body of the lens 130 along the path 162a and strikes one of the reflecting surfaces 142 or 143 adjacent to the edge 146 therebetween and is reflected downwardly thereby as at 162d whereby it strikes the reflecting surface 141 and is reflected thereby as at 162c; upon leaving the lens 130 through the front face 131, the ray 162c is again refracted so that it exits as the ray 162d that is directed back toward the source of the incident ray 162.

The signal light 100 must also serve as a source of illumination to provide a signal to observers that have no source of light for directing upon the front face 131 of the lens 130, and accordingly, the light source 117 has been provided so that the light therefrom can be passed through the lens 130 to serve as a signal. For safety purposes, it is necessary that the light from the signal light 100 be directed into a predetermined pattern, and to this end a plurality of optic elements 150 has been provided throughout the area of the rear face 132 of the lens 130. As may be best seen in FIGS. 3, 4 and 5, each of the optic elements 150 includes a generally convex optical surface 151, a generally concave optical surface 152 and a generally convex optical surface 153, the shape of the overall optic surface 150 on each of the optic elements 150 being best described as saddle shaped as will be explained more fully hereinafter.

The manner in which the optic elements 150 operate to focus and direct the light from the collimating lens 110 will be described with special reference to FIGS. 2 and 4. When the parallel bundle of light rays including the rays 120b, 121b and 122b strikes the convex optical surface 151 of the optic element 150, the central ray 121b which strikes the surface 151 normal thereto passes through the rear face 132 into the body of the lens 130 without refraction and continues therethrough and exits therefrom through the front face 131 without refraction and in a direction also normal to the front face 131 as the exit ray 121d. The upper light ray 120b, which strikes the optical surface 151 at an acute angle, upon entering the body of the lens 130 through the rear face 132 is refracted downwardly, and upon leaving the body of the lens 130 through the front face 131 is again refracted downwardly to provide the exit ray 120d. The lower light ray 122b, which also strikes the optic surface 151 at an acute angle, upon entering the body of the lens 130 through the rear face 132 is refracted upwardly, and upon leaving the body of the lens 130 through the front face 131 is again refracted upwardly to provide the exit ray 122d. All of the rays in the bundle are focused at 126 so as to form a predetermined pattern of light. It will be understood that the pattern of light in the horizontal direction is similar to that illustrated in the vertical direction in FIG. 2, whereby the two dimensional pattern of light from the optic element 150 is generally focused at 126 and is therefore directed into a predetermined pattern useful for signalling purposes.

The bundle of parallel light rays 123b, 124b and 125b upon striking an optic element 150 reacts in a similar manner. The central ray 124b which strikes the optical surface 151 normal thereto, passes through the rear face 132 into the body of the lens 130 without refraction and continues therethrough and exits therefrom through the front face 131 without refraction and in a direction also normal to the front face 131 as the exit ray 124d. The upper light ray 123b, which strikes the optic surface 151 at an acute angle, upon entering the body of the lens 130 through the rear face 132 is refracted downwardly, and upon leaving the body of the lens 130 through the front face 131 is further refracted downwardly to provide the exit ray 123d. The lower light ray 125b, which also strikes the optics surface 151 at an acute angle, upon entering the body of the lens 130 through the rear face 132 is refracted upwardly, and upon leaving the body of the lens 130 through the front face 131 is again refracted upwardly to provide the exit ray 125d. All of the rays in the bundle are focused at 127 so as to form a predetermined pattern of light. It will be understood that the pattern of light in the horizontal direction is similar to that illustrated in the vertical direction in FIG. 2, whereby the two dimensional pattern of light from the optic element 150 is focused at 127 and is therefore directed into a predetermined pattern useful for signalling purposes.

Recapitulating, and referring specifically to FIG. 4 of the drawings, the manner in which the collimating lens 110 and the lens 130 direct light rays such as the diverging light rays 120, 121, 122 and 128 will be described in detail. The light ray 120 which strikes the surface 112 at an acute angle, upon entering the body of the lens 110 is refracted downwardly along the path 120a, and upon leaving the body of the lens 110 through the front face 113 is further refracted downwardly to provide the exit ray 120b. The light rays 121 and 122 likewise are refracted upon entering the lens 110 along the paths 121a and 122a, respectively, and upon being refracted again when exiting from the lens 110 are directed into the rays 121b and 122b. The rays 120b and 121b and 122b are all parallel to each other and are directed substantially normal to the rear surface 132 of the lens 130. The central ray 121b, which strikes the optic surface 151 normal thereto, passes through the rear face 132 without refraction as at 121c and exits through the front face 131 without refraction in a direction also normal to the front face 131 as the exit ray 121d. The upper light ray 120b, which strikes the optic surface 151 at an acute angle, upon entering through the rear face 132 is directed downwardly along the path 120c, and upon leaving through the front face 131 is further refracted downwardly to provide the exit ray 120d. The lower light ray 122b, which also strikes the optic surface 151 on an acute angle, upon entering through the rear face 132 is refracted upwardly along the path 122c, and upon leaving through the front face 131 is again refracted upwardly to provide the exit ray 123d. All of the rays in the bundle are focused at 126 as explained above. Finally, the light ray 128, which also strikes the rear surface of the lens 110 at an acute angle is refracted along the path 128a and upon leaving the lens 110 is refracted along the path 128b, this ray being parallel to the rays 120b, 121b and 122b. The ray 128b strikes the optic surface 152 at a slight acute angle and is refracted along the path 128c and upon exiting through the front face 121 is again refracted slightly upwardly to form the exit ray 128d. The ray 128d together with like rays forms a second pattern of light issuing from the signal light 100, the total signal from the signal light 100 being a combination of the signal generated of the light rays focused at 126 and 127 and the signals from the rays such as the ray 128d in FIG. 4.

From FIGS. 3 and 5 it will be seen that substantially 50% of the surface area of the lens 130 is devoted to the reflector elements 140 and approximately 50% of the surface area of the lens 130 is devoted to the optic elements 150. It further is pointed out that the reflector elements 140 are arranged in groups of three and that the optic elements 150 are likewise arranged in groups of three. Each of the groups of three reflector elements 140 is completely surrounded by groups of three optic elements 150 and likewise each of the groups of three optic elements 150 is surrounded by groups of three reflector elements 140. Furthermore, the entire rear face 132 of the lens 130 as viewed in a direction substantially normal thereto, and is illustrated in FIG. 5, is seen to be made up of a plurality of regular geometric shapes, namely, a plurality of regular hexagons closely packed and interfitting to fill the complete area of the rear face 132. More specifically, each of the reflector elements 140 is in a hexagonal area and each of the optic elements 150 is in a hexagonal area.

An important feature of the present invention resides in the fact that the dimensions of the reflector areas and the dimensions of the optic areas are selected so that the greatest major dimension thereof as viewed in a direction normal to the front face 132 is no greater than about 0.175 inch, and each reflector area is spaced from the adjacent reflector areas a distance no greater than about 0.175 inch, and likewise each of the optic areas is spaced from each adjacent optic area a distance no greater than about 0.175 inch. As has been explained above, each reflector area includes a group of three reflector elements 140, whereby the greatest major dimension of the group of three elements 140 is no greater than about 0.175 inch and each reflector group is spaced from each adjacent reflector group a distance no greater than about 0.175 inch. Similarly, each optic area includes a group of three optic elements 150, whereby the greatest major dimension of the group of three optic elements 150 is no greater than about 0.175 inch and each optic group is spaced from each adjacent optic group a distance no greater than about 0.175 inch. When the reflector elements 140 and the groups of three thereof and the optic elements 150 and the groups of three thereof have such dimensions and are so arranged, the portion of the lens 130 visible through the front face 131 thereof has the same visual appearance to an observer, i.e., is uniformly lighted and has the same visual shape when viewed in daylight, when viewed at night by incident light falling on the front face 131 thereof, and when viewed at night by transmitted light passing therethrough from the source 117 to the observer. More particularly, the congruent area bounded by the flange 106 when viewed at a distance of about 50 feet appears uniformly lighted throughout and of the same shape both when lighted by light falling on the front face thereof and when lighted by light falling on the rear face thereof, thereby to present the same visual shape and design to the observer under all different types of lighting conditions encountered.

Figure 6:
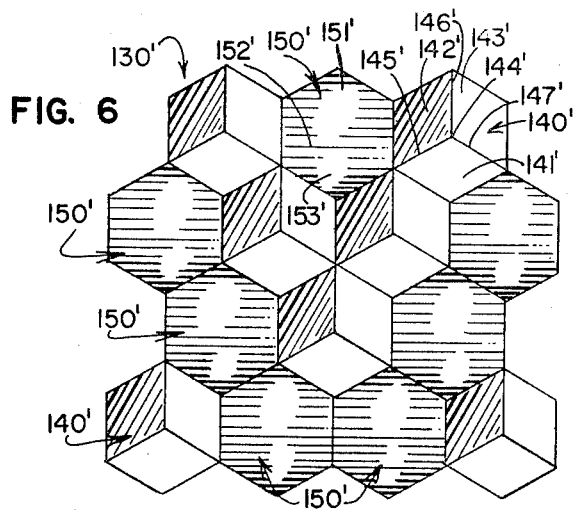
FIG. 6 is an elevational view of a portion of the mold against which the rear face of the lens in FIG. 5 was molded.

There is illustrated in FIG. 6 of the drawings a portion of a mold 130' from which is molded the rear face 132 of the lens 130. For the sake of convenience, the parts of the mold 130' for molding the various parts of the lens 130 have been given the same reference numerals as the corresponding parts of the lens 130 with the addition of the symbol (') thereto, it being understood that the mold of FIG. 6 conforms precisely to the rear surface 132 illustrated in FIG. 5, but with the male and female portions thereof reversed.

Figure 7:
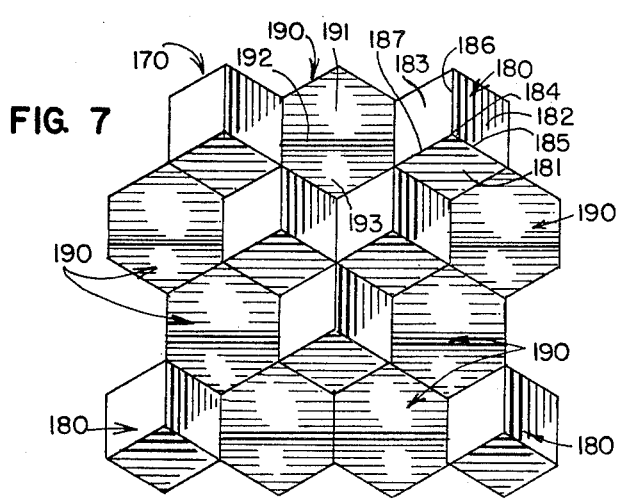
FIG. 7 is an elevational view of a portion of the master tool against which the mold of FIG. 6 was formed.
Figure 8:
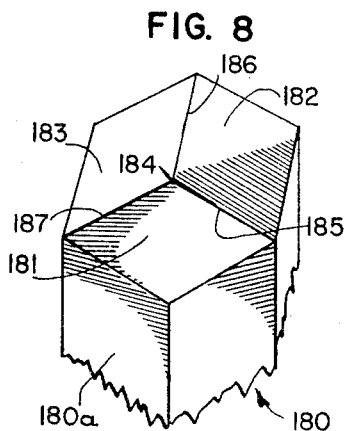
FIG. 8 is a perspective view on an enlarged scale of the upper end of a standard cube corner forming pin.
Figure 9:
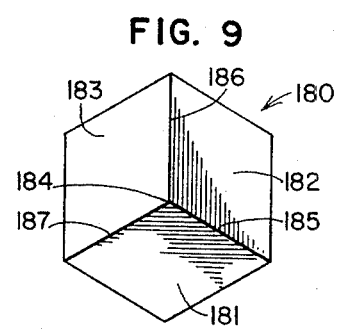
FIG. 9 is a plan view of the upper end of the pin of FIG. 8.
Figure 10:
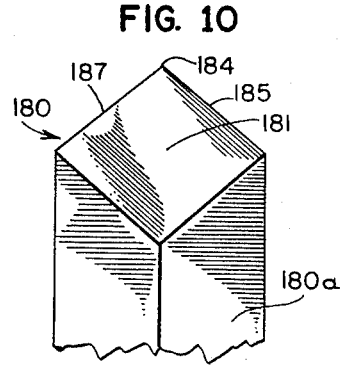
FIG. 10 is a side elevational view of the pin of FIG. 9 as viewed from the bottom of FIG. 9.
Figure 11:
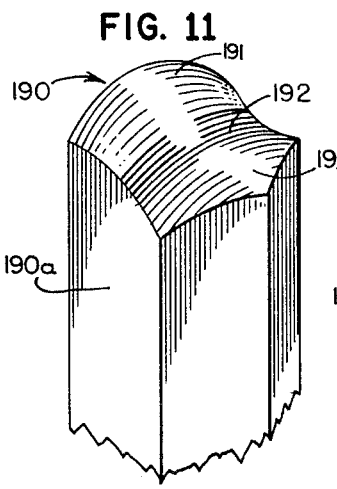
FIG. 11 is a perspective view on an enlarged scale of the upper end of an optic pin used in forming the lens of FIG. 1.

There is illustrated in FIG. 7 a portion of the master tool from which is molded the mold of FIG. 6 to form the rear surface 132 of the lens 130 illustrated in FIG. 5, the master tool in FIG. 7 being designated by the numeral 170. The master tool 170 is formed of a plurality of individual pins 180 and 190, the pins 180 corresponding to the reflector elements 140 and the pins 190 corresponding to the optic elements 150. The pins 180 are illustrated in detail in FIGS. 8 to 10 of the drawings, and as is illustrated in FIG. 9, each pin 180 is hexagonal in outline and includes a shank 180a having six elongated sides. The upper end of the shank 180a of the pin 180 is shaped to provide areas 181, 182 and 183 which are used to form the portions of the mold 130' against which are molded respectively the reflector surfaces 141, 142 and 143. The pin surfaces 181, 182 and 183 are all disposed mutually perpendicular to each other and joined at a cube corner or peak 184 and along upper edges 185, 186 and 187.

Figure 12:
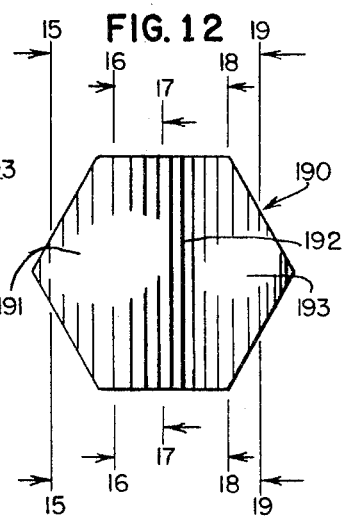
FIG. 12 is a plan view of the upper end of the pin of FIG. 11.
Figure 13:
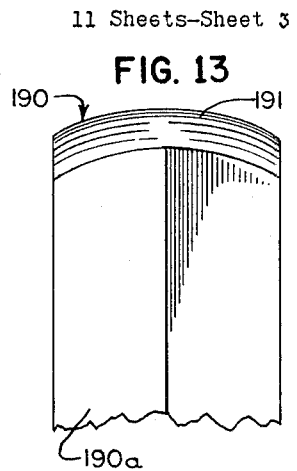
FIG. 13 is a side elevational view of the pin of FIG. 12 as viewed from the right side thereof.
Figure 13A:
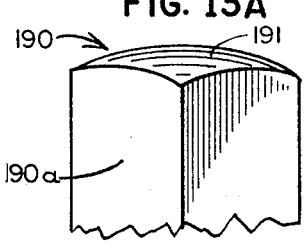
FIG. 13A is a side elevational view of the pin of FIG. 12 as viewed from the left side thereof.
Figure 14:
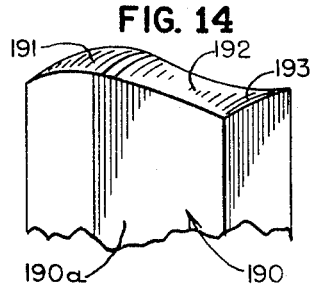
FIG. 14 is a side elevational view of the pin of FIG. 12 as viewed from the bottom of FIG. 12.
Figure 15:
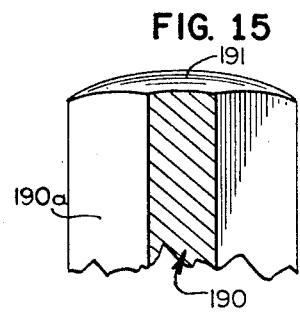
FIG. 15 is a view in vertical section along the line 15—15 of FIG. 12.
Figure 16:
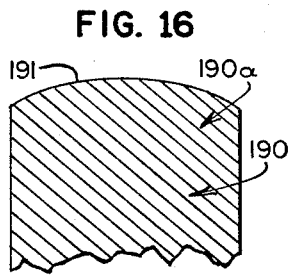
FIG. 16 is a view in vertical section along the line 16—16 of FIG. 12.
Figure 17:
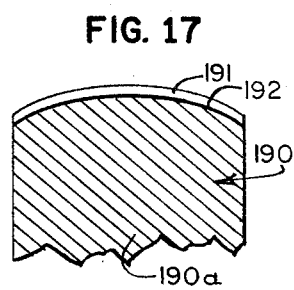
FIG. 17 is a view in vertical section along the line 17—17 of FIG. 12.
Figure 18:
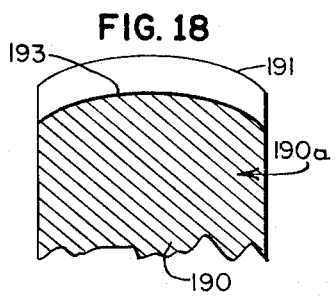
FIG. 18 is a view in vertical section along the line 18—18 of FIG. 12.
Figure 19:
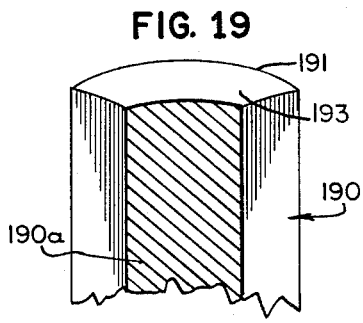
FIG. 19 is a view in vertical section along the line 19—19 of FIG. 12.

The construction of the optic pin 190 is illustrated in FIGS. 11 to 19, inclusive, wherein it will be seen that the pin 190 also has a hexagonal outline as viewed from the top in FIG. 12 and has six elongated sides. The upper end of the shank of the pin 190 is shaped to provide the generally saddle shaped surface including a first higher convex area 191, a depressed area 192 and a second convex area 193 spaced from the convex area 191 by the depressed area 192. The pins 180 and the pins 190 are formed of steel, and preferably stainless steel.

To form the master tool 170, a plurality of the pins 180 and 190 is arranged as illustrated in FIG. 7, the pins being closely packed and interfitting and clamped (by structure not shown) in the proper assembled position to serve as an assembly against which to form the surface of the mold 130' illustrated in FIG. 6. Preferably the mold 130' is formed from the master tool 170 by an electroforming process. In the electroforming process, the outer surfaces of the pins 180 and 190 in the master tool 170 may first be coated with a separating medium. The master tool 170 is then connected as the anode in an electroplating apparatus and a layer of nickel metal is electroplated thereon to a thickness of about ¼ inch. The thus partially prepared mold and the master tool are then transferred to a copper plating system and a backing is plated on the nickel plating to a thickness on the order of about ½ inch. The resultant mold 130' is then stripped from the master tool 170 and the rear surface thereof machined if necessary to fit a mold mounting, the resultant mold 130' being illustrated in FIG. 6. The lens 130 is then molded from the mold 130' in the usual manner.

There is illustrated in FIGS. 20 through 30B of the drawings a second form of the invention wherein the optic surface is formed as a plurality of concentric rings substantially completely filling the surface of the lens. Referring specifically to FIGS. 20 and 21, there is illustrated a light assembly 200 in the form of a signal light made in accordance with and embodying the principles of the present invention, the light assembly 200 having a generally rectangular shape with the vertical edges thereof bowed outwardly. Referring to FIG. 21, it will be seen that the light assembly 200 includes a housing 201 having a generally cylindrical side wall 202 closed at the rear end by a rear wall 203. In cross section, the cylindrical side wall 202 is shaped generally like and conforms to the outline of the signal light 200 as viewed in FIG. 20. Mounted on the housing 201, and specifically on the rear wall 203 thereof, is a lamp socket 215 having portions extending outwardly beyond the housing 201 and carrying electrical connections (not shown) for attachment to a suitable electrical system (not shown). Mounted in the lamp socket 215 is an electric lamp 216 including therein a light source as at 217 such as a filament of tungsten wire which can be heated to incandescence to cause light to radiate therefrom.

Mounted on the forward portion of the housing 201 and carried thereby is a lens 230 made in accordance with and embodying the principles of the present invention. As illustrated, the lens 230 is formed of a synthetic organic plastic resin, the preferred resin being methyl methacrylate resin, a body of the resin being molded as illustrated to provide a substantially flat front face 231 and a configurated rear face 232. The outer periphery of the lens 230 is shaped complementary to the inner surfaces of the forward end of the housing side wall 202 so as to fit snugly therein, means preferably being provided to form a fluidtight and airtight seal between the housing side wall 202 and the lens 230 so as to seal from the atmosphere the volume enclosed by the interior of the housing 201 and the rear face 232 of the lens 230.

The signal light 200 must serve at night as a reflector for the headlights of other vehicles, such as an automobile, and to this end there is provided throughout the area of the lens bounded by the side wall 202 a plurality of reflector elements 240, the reflector elements 240 being of the retrodirective type and specifically of the full cube corner type. Referring particularly to FIGS. 22 to 24, each of the reflector elements 240 includes three reflector surfaces 241, 242 and 243 disposed mutually perpendicular one to the other and joining at a rear corner 244 along edges 245, 246 and 247 extending forwardly from the corner 244; more particularly, the edge 245 is disposed between the reflecting surfaces 241 and 242, the edge 246 is disposed between the reflecting surfaces 242 and 243, and the edge 247 is disposed between the reflecting surfaces 241 and 243. As viewed in FIGS. 22 and 24, each of the reflector elements 240 is in the form of a regular hexagon, the rear corner 244 extending inwardly into the paper in FIG. 22 and extending outwardly from the paper in FIG. 24. It will be seen that the reflector elements 240 are uniformly distributed throughout the area of the lens 230.

The manner in which the reflector elements 240 operate to reflect incident light falling upon the front face 231 back toward the source of the incident light is illustrated in FIGS. 21 and 23. In the central portion of FIG. 21, the incident ray 260 strikes the front face 231 of the lens 230 substantially perpendicular thereto and passes into the lens 230 without refraction and is internally reflected from the faces of the reflector element 240 and exits from the lens 230 as at 260d back toward the source of the incident ray 260. In the lower portion of FIG. 21, an incident ray 261 striking the front face 231 at an acute angle is refracted upon entering the body of the lens 230 and is also internally reflected from the surfaces of the reflector element 240 and exits with further refraction as a ray 261d directed back toward the source of the incident ray 261. Referring to FIG. 23, it will be seen that the incident ray 260 striking the face 231 substantially perpendicular thereto passes into the body of the lens 230 without refraction as the ray 260a and strikes one of the reflecting surfaces 242–243 adjacent to the edge 246 therebetween to be reflected downwardly thereby as at 260b whereby it strikes the reflecting surface 241 and is reflected thereby as at 260c and leaves the front face 231 of the lens 230 without refraction as the exit ray 260d. A ray 262 striking the front face 231 at an acute angle is refracted in the body of the lens 230 along the path 262a and strikes one of the reflecting surfaces 242–243 adjacent to the edge 246 therebetween and is reflected thereby downwardly as at 262b whereby it strikes the reflecting surface 241 and is reflected upwardly thereby as at 262c; upon leaving the lens 230 through the front face 231, the ray 262c is again refracted so that it exits as the ray 262d directed back toward the source of the incident ray 262. Finally, an upwardly directed ray 263 also striking the front face 231 at an acute angle is refracted upon entering the body of the lens 230 along the path 263a and strikes one of the reflecting surfaces 242–243 adjacent to the edge 246 therebetween and is reflected downwardly thereby as at 263b whereby it strikes the reflecting surface 241 to be reflected downwardly thereby as at 263c; upon leaving the lens 230 through the front face 231, the ray 263c is again refracted so that it exits as the ray 263d that is directed downwardly and back toward the source of the incident ray 263.

The signal light 200 must also serve as a source of illumination to provide a signal to observers that have no source of light for directing upon the front face of the lens 230, and accordingly, the light source 217 has been provided so that the light therefrom can be passed through the lens 230 to serve as a signal. For safety purposes, it is necessary that the light from the signal light 200 be directed into a predetermined pattern, and to this end the concentric ring optic system 250 has been provided covering substantially the entire area of the rear face 232 of the lens 230. The optic system 250 more specifically includes a plurality of concentric dioptric rings 251 disposed adjacent to the center of the lens 230 and a plurality of catadioptric rings 252 disposed toward the outer periphery of the lens 230.

The manner in which the optic system 250 operates to focus and to direct the light from the light source 217 will be described with special reference to FIGS. 21 and 23. As is understood in the art, the dioptric rings 251 and the catadioptric rings 252 in the optic system 250 are capable of accepting the diverging rays of light from the light source 217 and redirecting the diverging light rays into predetermined desirable optical patterns. For example, and referring to FIG. 21, the central pair of diverging light rays 253 and 254 issuing from the light source 217 strike a dioptric ring 251 and are refracted upon entering the lens 230 and upon exiting from the front face 231 thereof as the rays 253d and 254d and are focused as at 255. Similarly, the lower pair of light rays 256 and 257 diverging from the light source 217 fall upon a dioptric ring 251 and upon entering the lens 230 are refracted and upon exiting through the front face 231 thereof are further refracted to emerge as rays 256d and 257d and are focused as at 258. Finally, the upper pair of diverging light rays 259 and 269 strike a catadioptric ring 252 and are refracted upon entering the lens 230 and are internally reflected and again refracted upon leaving the front face 231 thereof to provide the exit rays 259d and 269d, the rays 259d and 269d having a virtual focus (not shown). Each of the three pairs of light rays illustrated contributes to a predetermined pattern of light seen when the front face 231 of the lens 230 is viewed by an observer.

Further details of the manner in which the optic system 250 operates to focus and direct the light from the light source 217 will be described with special reference to FIG. 23. The upper pair of light rays 267 and 268 strike one of the dioptric rings 251 at an acute angle and are refracted upon entering the body of the lens 230 to provide the rays 267a and 268a. Upon exiting from the front face 231 of the lens 230, the rays 267a and 268a are refracted again to provide the exit rays 267d and 268d. The exit rays 267d and 268d have a virtual focus at 268'. Similarly, a bundle of three diverging light rays 264, 265 and 266 striking a dioptric ring 251 at acute angles are refracted upon entering the body of the lens 230 to provide the rays 264a, 265a and 266a; these rays upon exiting from the lens 230 through the front face 231 are again refracted to provide the exit rays 264d, 265d and 266d, these three rays having a virtual focus (not shown). It will be understood that the pattern of light in the horizontal direction is similar to that illustrated in the vertical direction in FIGS. 21 and 23, whereby a two dimensional pattern of light from the optic system 250 appears as a concentrated cone directed into a predetermined pattern and useful for signalling purposes.

As may be best seen in FIGS. 22 and 24, each of the reflector elements 240 is completely surrounded by the elements of the optic system 250, the reflector elements 240 being uniformly distributed throughout the optic system 250 and being arranged in staggered rows. Furthermore, the entire rear surface 232 of the lens 230 as viewed in a direction substantially normal thereto as seen to be made up of a plurality of regular geometric shapes, namely, a plurality of regular hexagons, closely packed and interfitting to fill the complete area of the rear face 232. Certain of the regular hexagons are in the form of a reflector element 240, and the remainder of the hexagons cooperate to form the dioptric-catadioptric optic system 250.

An important feature of the present invention resides in the fact that the dimensions of the reflector elements 240 and the spacing between adjacent ones of the reflector elements 240 are selected so that the greatest dimension thereof as viewed in a direction normal to the rear face 232 is no greater than about 0.175 inch and the distance between adjacent ones of the reflector elements 240 is no greater than about 0.175 inch. When the reflector elements 240 have such dimensions and are so arranged, the lens 230 appears to be uniformly illuminated when viewed by reflected light from the reflector elements 240. Similarly, the dioptric-catadioptric optic system 250 will likewise appear to be uniformly illuminated throughout the area of the front face of the lens 230 when the only source of light is the filament 217. Accordingly, the lens 230 has the same visual appearance to an observer, i.e., is uniformly lighted and has the same visual shape when viewed in the daylight, when viewed at night by incident light falling on the front face 231 thereof, and when viewed at night by transmitted light passing therethrough from the source 217 to the observer. More particularly, the congruent area of the lens 230 bounded by the housing side wall 202 when viewed at a distance of about 50 feet appears uniformly lighted throughout and of the same shape both when lighted by light falling on the front face thereof and when lighted by light falling on the rear face thereof, thereby to present the same visual shape and design to an observer under all different types of lighting conditions encountered.

There is illustrated in FIGS. 25 and 26 a portion of a mold 230' against which the rear face 232 of the lens 230 is molded. For the sake of convenience, the parts of the mold 230' for molding the various parts of the lens 230 have been given the same reference numerals as the corresponding parts of the lens 230 with the addition of the symbol (') thereto, it being understood that the mold of FIGS. 25 and 26 conforms precisely to the rear surface 232 illustrated in FIGS. 22 and 23, but with the male and female portions thereof reversed.

Figure 27A:
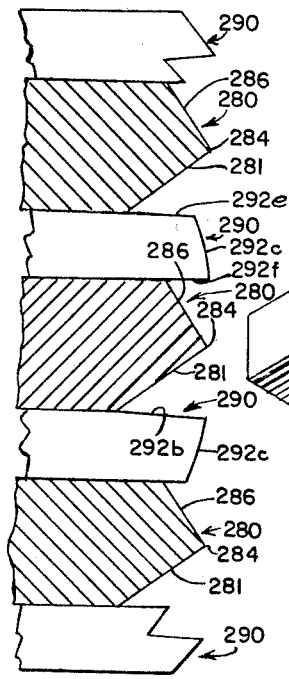
FIG. 27A is a view in vertical section through the master mold of FIG. 27 along the line 27A—27A thereof.
Figure 27:
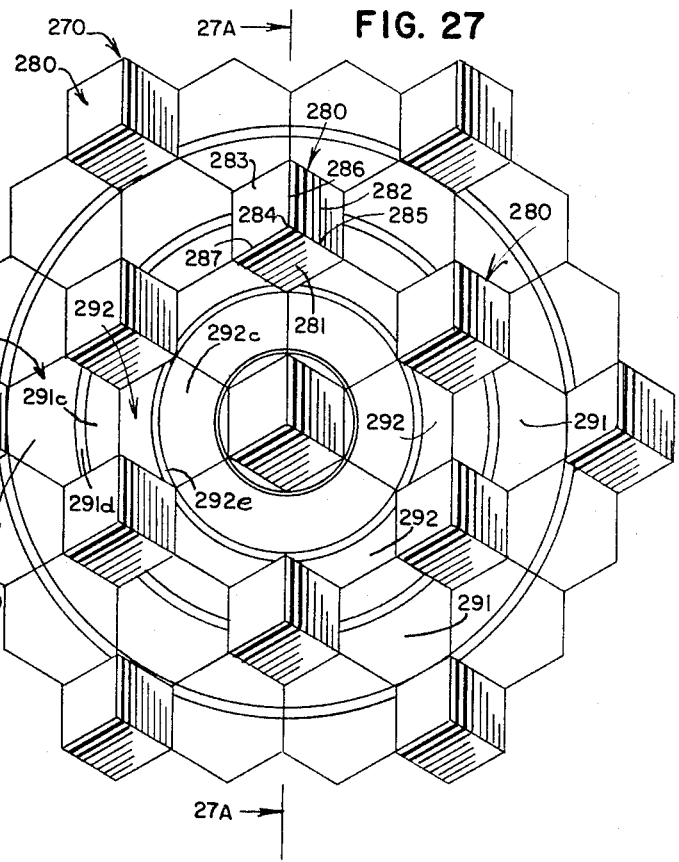
FIG. 27 is an elevational view of a portion of the master tool against which the mold of FIG. 25 was formed.

There is illustrated in FIGS. 27 and 27A a portion of the master tool from which is molded the mold of FIGS. 25 and 26 to form the rear face 232 of the lens 230 illustrated in FIG. 24, the master tool in FIGS. 27 and 27A being designated by the numeral 270. The master tool 270 is formed of a plurality of individual pins, each of the pins as illustrated being hexagonal in outline and closely interfitting completely to fill the area defined by the master tool. A first form of pin 280 is provided corresponding to the reflector elements 240, the upper ends of the pins 280 being shaped to provide areas 281, 282 and 283 which are used to form the portions of the mold 230' against which are molded respectively the reflector surfaces 241, 242 and 243. The pin surfaces 281, 282 and 283 are all disposed mutually perpendicular to each other and are joined at the cube corner or peak 284 and along upper edges 285, 286 and 287.

Figure 28:
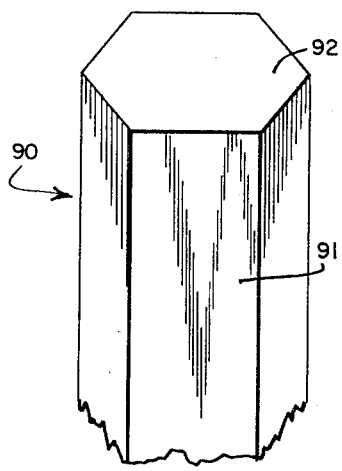
FIG. 28 is a perspective view of a blank pin useful in forming the master tool of FIGS. 27 and 27A.
Figure 28A:
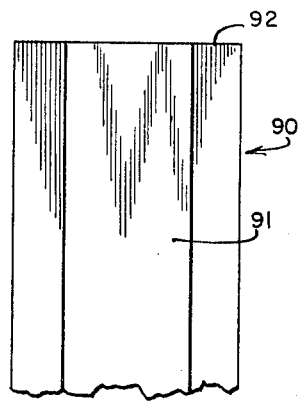
FIG. 28A is a side elevational view of the blank pin of FIG. 28 as seen from the bottom of FIG. 28.

The remaining pins in the master tool 270 all bear a portion of the optic system, the pins more specifically carrying the surfaces of a concentric ring optic system including both dioptric and catadioptric surfaces 251 and 252, respectively on the lens 230 as explained above. In forming the optic system on the master tool 270, a plurality of blank pins 90 is provided, the details of construction of one of the pins 90 being illustrated in FIGS. 28 and 28A. The pin 90 includes a shank 91 that is essentially hexagonal in horizontal cross section and is provided at the upper end thereof with a flat planar surface 92 that is disposed normal to the axis of the shank 91. To form the optic system of the tool 270, an assembly of the blank pins 90 and the cube corner pins 280 is first made, the cube corner pins 280 being distributed throughout the blank pins in the pattern illustrated in FIG. 27, a sufficient number of the blank pins 90 being provided completely to fill in interfitting relationship the entire area of the master tool 270 in cooperation with the cube corner pins 280. The pins 280 are then partially withdrawn so that the cube corners 284 thereof are disposed well below the top surfaces 92 of the blank pins 90. Thereafter there is cut in the remaining exposed surfaces 92 of the blank pins 90 the optic system 250 as illustrated.

Figure 29:
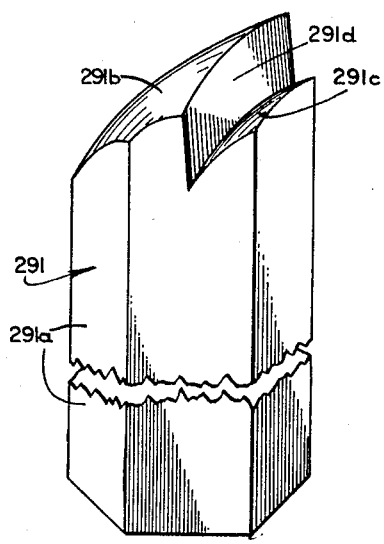
FIG. 29 is a perspective view of one type of optic pin forming a part of the master tool of FIG. 27.
Figure 30:
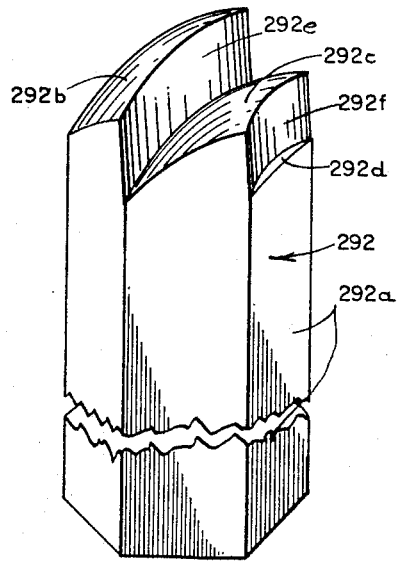
FIG. 30 is a perspective view of a second form of optic pin forming a part of the master tool of FIG. 27.
Figure 29A:
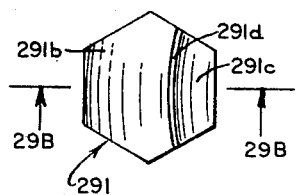
FIG. 29A is a plan view on a reduced scale of the pin of FIG. 29.
Figure 30A:
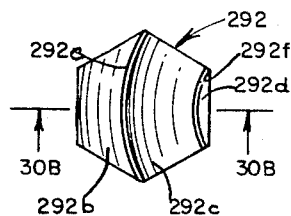
FIG. 30A is a plan view on a reduced scale of the end of the pin of FIG. 30.
Figure 29B:
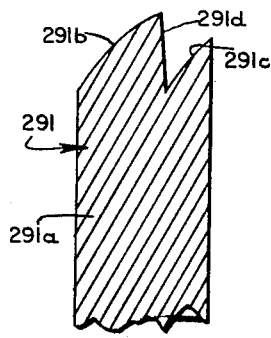
FIG. 29B is a view in vertical section through the pin of FIG. 29A along the line 29B—29B thereof.
Figure 30B:
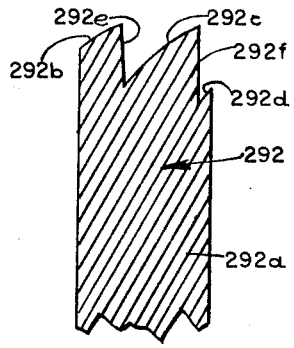
FIG. 30B is a view in vertical section through the pin of FIG. 30A along the line 30B—30B thereof.

It will be appreciated from FIG. 27 that a large number of different shapes of ends are provided on the pins 290, the particular shapes and constructions of two of the typical pins 291 and 292 being illustrated in FIGS. 29 to 30B of the drawings. Referring to FIGS. 29, 29A and 29B, it will be seen that the pin 291 still retains the elongated hexagonal shank 291a thereof but there has been formed on the upper end thereof a pair of convexly curved optic forming surfaces 291b and 291c as well as a riser surface 291d. Referring to FIGS. 30, 30A and 30B, it will be seen that the pin 292 still retains the elongated hexagonal shank 292a thereof but there have been formed on the upper end thereof three convexly curved optic forming surfaces 292b, 292c, and 292d, together with corresponding riser surfaces 292e and 292f. A suitable assembly of the pins 291 and 292 provide the intermost dioptric ring forming surfaces 251 in FIG. 27.

To complete the master tool 270, the reflector forming pins 280 are returned to the normal position thereof illustrated in FIGS. 27 and 27A after which all of the pins 280 and 290 are clamped in the positions illustrated. The mold 230' is formed from the master tool 270 by the electroforming process described above in detail with respect to the mold 130', and in the interest of brevity, the details of the electroforming process will not here be repeated. After the resultant mold 230' has been stripped from the master tool 270 and the rear surface thereof machined if necessary to fit a mold mounting, the lens 230 can be molded therefrom in the usual manner.

There is illustrated in FIGS. 31 through 43 of the drawings a third form of the invention wherein the optic surface is also formed as a plurality of concentric rings substantially completely filling the surface of the lens, wherein the reflectors are circular in outline. Referring specifically to FIGS. 31 and 32, there is illustrated a light assembly 300 in the form of a signal light made in accordance with and embodying the principles of the present invention, the light assembly 300 having a generally rectangular shape with the vertical edges thereof bowed outwardly. Referring to FIG. 32, it will be seen that the light assembly 300 includes a housing 301 having a generally cylindrical side wall 302 closed at the rear end by a rear wall 303. In cross section, the cylindrical side wall 302 is shaped generally like and conforms to the outline of the light 300 as viewed in FIG. 31. Mounted on the housing 301 and specifically on the rear wall 303 thereof, is a lamp socket 315 having portions extending outwardly beyond the housing 301 and carrying electrical connections (not shown) for attachment to a suitable electrical system (not shown). Mounted in the lamp socket 315 is an electric lamp 316 including therein a light source as at 317 such as a filament of tungsten wire which can be heated to incandescence to cause light to radiate therefrom.

Mounted on the forward portion of the housing 301 and carried thereby is a lens 330 made in accordance with and embodying the principles of the present invention. As illustrated, the lens 330 is formed of a synthetic organic plastic resin, the preferred resin being methyl methacrylate resin, a body of the resin being molded as illustrated to provide a substantially flat front face 331 and a configurated rear face 332. The outer periphery of the lens 330 is shaped complementary to the inner surfaces of the forward end of the housing side wall 302 so as to fit snugly therein, means preferably being provided to form a fluidtight and airtight seal between the housing side wall 302 and the lens 330 so as to seal from the atmosphere the volume enclosed by the interior of the housing 302 and the rear surface 332 of the lens 330.

Figure 35:
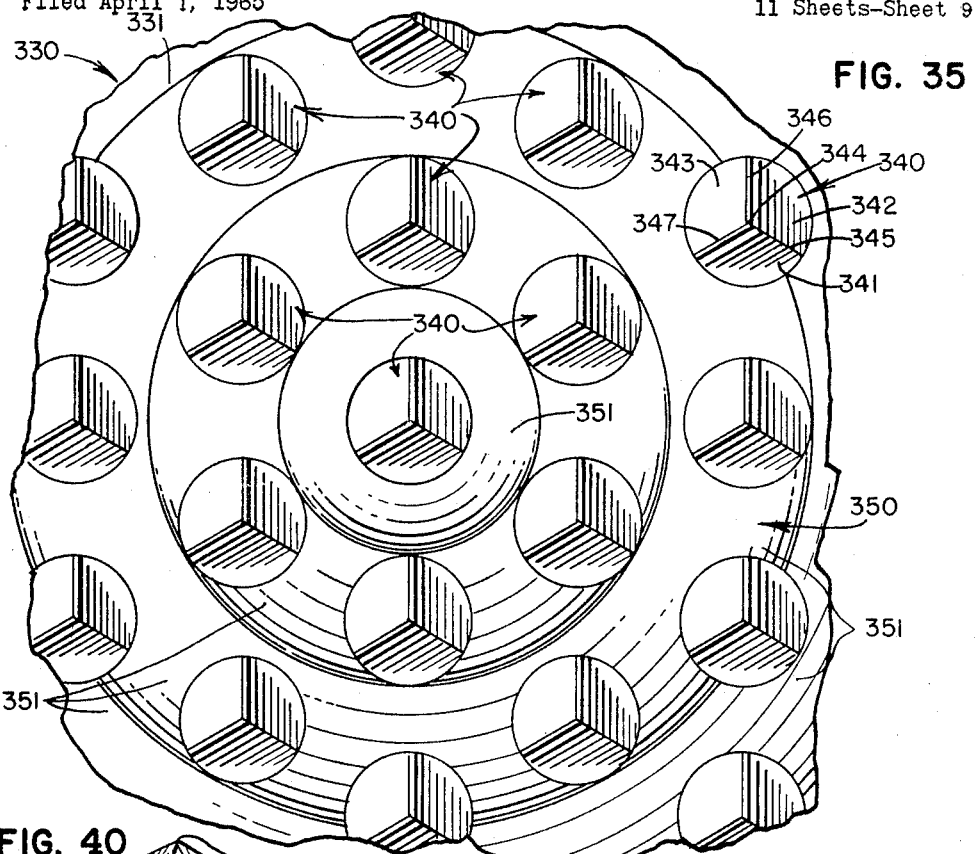
FIG. 35 is an elevational view of the rear face of the portion of the lens illustrated in FIG. 33.
Figure 40:
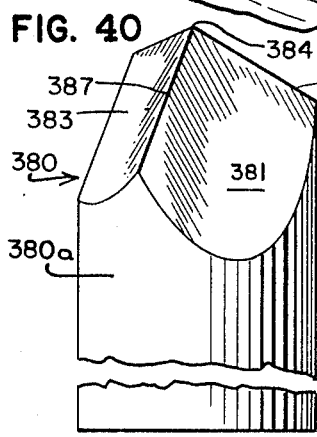
FIG. 40 is a perspective view on an enlarged scale of the upper end of a circular cube corner forming pin.
Figure 41:
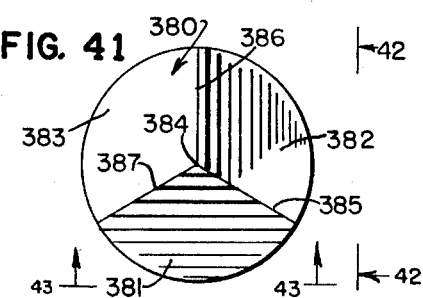
FIG. 41 is a plan view of the upper end of the pin of FIG. 40.
Figure 43:
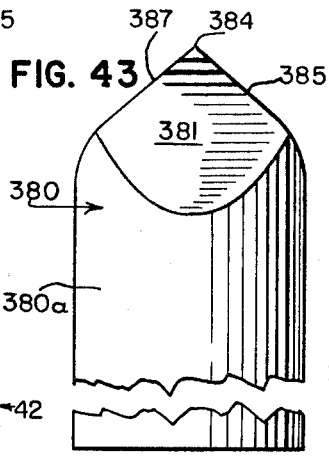
FIG. 43 is a side elevational view of the pin of FIG. 41 as viewed in the direction of the arrows 43—43 thereof.
Figure 42:
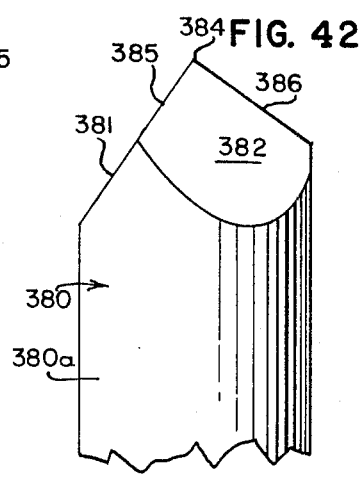
FIG. 42 is a side elevational view of the pin of FIG. 41 as viewed in the direction of the arrows 42—42 thereof.

The signal light 300 must serve at night as a reflector for the lights of other vehicles, such as an automobile, and to this end there is provided throughout the area of the lens bounded by the side wall 302 a plurality of reflector elements 340, the reflector elements 340 being of the retrodirective type and specifically of the substantially full cube corner type. Referring particularly to FIGS. 33 and 35, each of the reflector elements 340 includes three reflector surfaces 341, 342 and 343 disposed mutually perpendicular one to the other and joining at a rear corner 344 along edges 345, 346 and 347 extending forwardly from the corner 344; more particularly, the edge 345 is disposed between the reflecting surfaces 341 and 342, the edge 346 is disposed between the reflecting surfaces 342 and 343, and the edge 347 is disposed between the reflecting surfaces 341 and 343. As viewed in FIGS. 33 and 35, each of the reflector elements 340 is in the form of a circle, the rear corner 344 extending inwardly into the paper in FIG. 33 and extending outwardly from the paper in FIG. 35. It will be seen that the reflector elements 340 are uniformly distributed throughout the area of the lens 330 in staggered rows.

The manner in which the reflector elements 340 operate to reflect incident light falling upon the front face 331 back toward the source of the incident light is illustrated in FIGS. 32 and 34. In the central portion of FIG. 32, the incident light ray 360 strikes the front face 331 of the lens 330 substantially perpendicular thereto and passes into the lens 330 without refraction and is internally reflected from the faces of the reflector element 340 and exits from the lens 330 as at 360d back toward the source of the incident ray 360. In the upper portion of FIG. 32, an incident ray 361 striking the front face 331 from above and at an acute angle is refracted upon entering the body of the lens 330 and is also internally reflected from the surfaces of the reflector element 340 and exits with additional refraction as a ray 361d directed back toward the source of the incident ray 361. In the lower portion of FIG. 32, an incident ray 362 directed upwardly and striking the front face 331 at an acute angle is refracted upon entering the body of the lens 330 and is also internally reflected from the surfaces of the reflector element 340 and exits with further refraction as the ray 362d directed back toward the source of the incident ray 361.

Referring to FIG. 34, it will be seen that the incident ray 360 striking the face 331 substantially perpendicular thereto passes into the body of the lens 330 without refraction as the ray 360a and strikes one of the reflecting surfaces 342–343 adjacent to the edge 346 therebetween to be reflected downwardly thereby as at 360b whereby it strikes the reflecting surfaces 341 and is reflected thereby as at 360c and leaves the front face 331 of the lens 330 without refraction as the exit ray 360d. The ray 361 striking the front face 331 from above and at an acute angle is refracted upon entering the body of the lens 330 along the path 361a and strikes one of the reflecting surfaces 342–343 adjacent to the edge 346 therebetween and is reflected thereby downwardly as at 361b whereby it strikes the reflecting surface 341 and is reflected upwardly thereby as at 361c; upon leaving the lens 330 through the front face 331, the ray 361c is again refracted so that it exits as the ray 361d directed back toward the source of the incident ray 361. Finally, the upwardly directed ray 363 also striking the front face 331 at an acute angle is refracted upon entering the body of the lens 330 along the path 363a and strikes one of the reflecting surfaces 342–343 adjacent to the edge 346 therebetween and is reflected downwardly thereby as at 363b whereby it strikes the reflecting surface 341 to be reflected downwardly thereby as at 363c; upon leaving the lens 330 through the front face 331, the ray 363c is again refracted downwardly so that it exits as the ray 363d that is directed downwardly and back toward the source of the incident ray 363.

The signal light 300 must also serve as a source of illumination to provide a signal to observers that have no source of light for directing upon the front face 331 of the lens 330, and accordingly, the light source 317 has been provided so that the light therefrom can be passed through the lens 330 to serve as a signal. For safety purposes, it is necessary that the light from the signal light 300 be directed into a predetermined pattern, and to this end the concentric ring optic system 350 has been provided covering substantially the entire area of the rear face 332 of the lens 330. The optic system 350 more specifically includes a plurality of concentric dioptric rings 351 disposed concentrically about the approximate geometric center of the lens 330 and extending outwardly to the outer periphery thereof. The manner in which the optic system 350 operates to focus and direct the light from the light source 317 will be described with special reference to FIGS. 32 and 34. As is understood in the art, the dioptric rings 351 in the optic system 350 are capable of accepting the diverging rays of light from the light source 317 and redirecting the diverging light rays into predetermined desirable optical patterns. For example, and referring to FIG. 32, the central pair of diverging light rays 353 and 354 issuing from the light source 317 strike a dioptric ring 351 and are refracted upon entering the lens 330 and upon exiting from the front face 331 thereof as the rays 353d and 354d and are focused as at 355. Similarly the lower pair of light rays 356 and 357 diverging from the light source 317 fall upon a dioptric ring 351 and upon entering the lens 330 are refracted and upon exiting from the front face 331 thereof are further refracted and emerge as rays 356d and 357d and are focused as at 358. Finally, the upper pair of diverging light rays 359 and 369 strike a dioptric ring 351 and are refracted upon entering the lens 330 and are refracted upon leaving the front face 231 thereof to provide the exit rays 359d and 369d, the rays 359d and 369d being focused as at 359'. Each of the three pairs of light rays illustrated contributes to a predetermined pattern of light seen when the front face 331 of the lens 330 is viewed by an observer.

Further details of the manner in which the optic system 350 operates to focus and direct the light from the light source 317 will be described with special reference to FIG. 34. The upper pair of light rays 359 and 369 strike one of the dioptric rings 351 at an acute angle and are refracted upon entering the body of the lens 330 to provide the rays 359a and 369a. Upon exiting from the front face 331 of the lens 330, the rays 359a and 369a are refracted again to provide the exit rays 359d and 369d which are focused as at 359'. Similarly, the diverging light rays 353 and 354 striking a dioptric ring 351 at acute angles are refracted upon entering a body of the lens 330 to provide the rays 353a and 354a; these rays upon exiting from the lens 330 through the front face 331 are again refracted to provide the exit rays 353d and 354d, these rays being focused as at 355. It will be understood that the pattern of light in the horizontal direction is similar to that illustrated in the vertical direction in FIGS. 32 and 34, whereby the two dimensional pattern of light from the optic system 350 appears as a concentrated cone directed into a predetermined pattern and useful for the signalling purposes.

As may be best seen in FIGS. 33 and 35, each of the reflector elements 340 is completely surrounded by the elements of the optic system 350, the reflector elements 340 being uniformly distributed throughout the optic system 350 and being arranged in staggered rows. An important feature of the present invention resides in the fact that the dimensions of the reflector elements 340 and the spacing between adjacent ones of the reflector elements 340 are selected so that the greatest dimension thereof as viewed in a direction normal to the rear face 332 is no greater than about 0.175 inch and the distance between adjacent ones of the reflector elements 340 is no greater than about 0.175 inch. When the reflector elements 340 have such dimensions and are so arranged, the lens 330 appears to be uniformly illuminated when viewed by the reflected light from the reflector elements 340. Similarly, the dioptric ring optic system 350 will likewise appear to be uniformly illuminated throughout the area of the front face of the lens 330 when the only source of light is the filament 317. Accordingly, the lens 330 has the same visual appearance to an observer, i.e., is uniformly lighted and has the same visual shape when viewed in the daylight, when viewed at night by incident light falling on the front face 331 thereof, and when viewed at night by transmitted light passing therethrough from the source 317 to the observer. More particularly, the congruent area of the lens 330 bounded by the housing side wall 302 when viewed at a distance of about 50 feet appears uniformly lighted throughout and of the same shape both when lighted by light falling on the front face thereof and when lighted by light falling on the rear face thereof, thereby to present the same visual shape and design to an observer under all different types of lighting conditions encountered.

Figure 36:
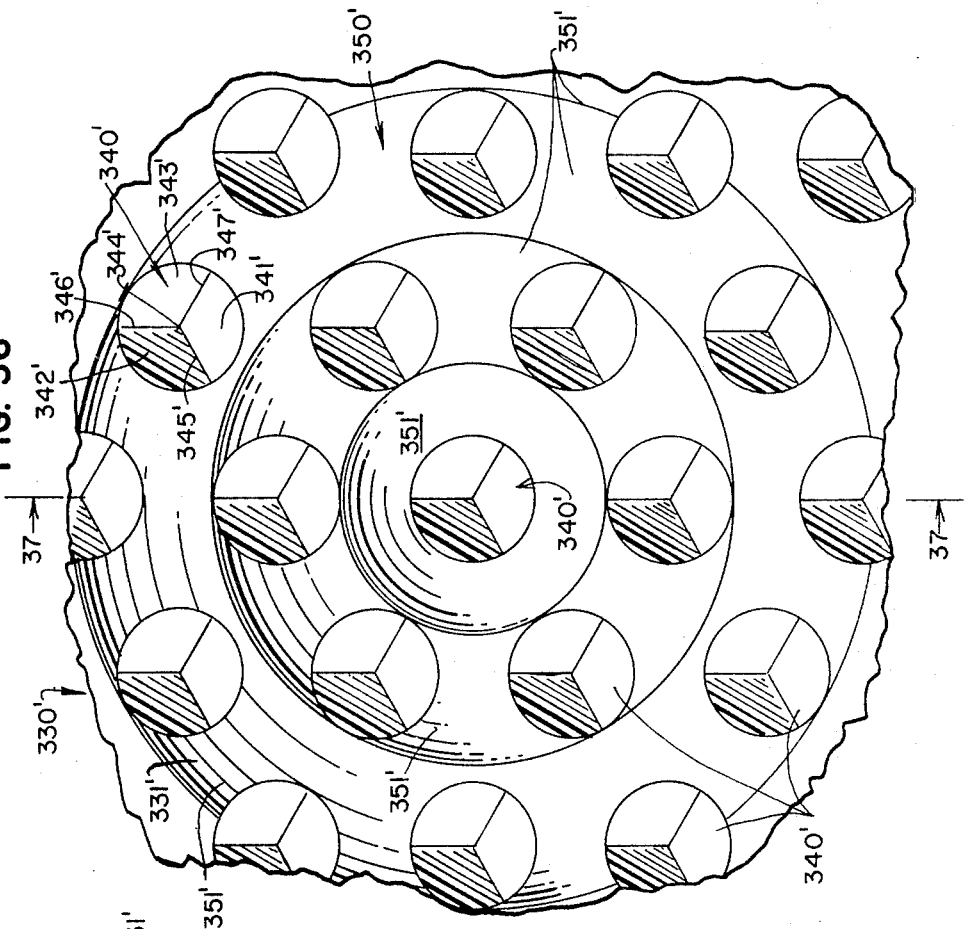
FIG. 36 is an elevational view of a portion of the mold against which the rear face of the lens illustrated in FIG. 33 was molded.
Figure 37:
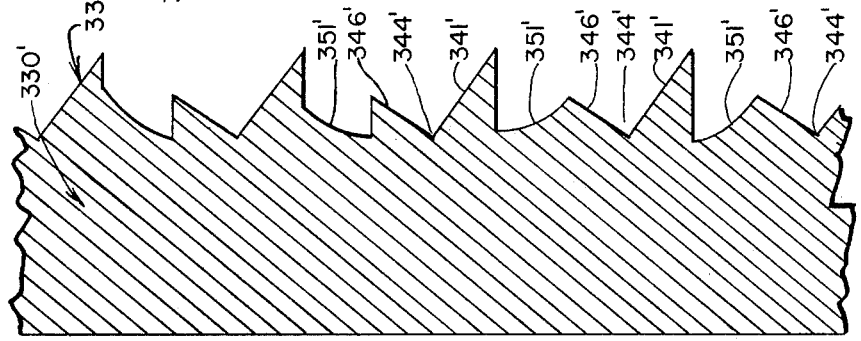
FIG. 37 is a view in vertical section through the mold of FIG. 36 along the line 37—37 thereof.

There is illustrated in FIGS. 36 and 37 a portion of the mold 330' against which the rear face 332 of the lens 330 is molded. For the sake of convenience, the parts of the mold 330' for molding the various parts of the lens 330 have been given the same reference numerals as the corresponding parts of the lens 330 with the addition of the symbol (') thereto, it being understood that the mold of FIGS. 36 and 37 conforms precisely to the rear surface 332 illustrated in FIGS. 34 and 35, but with the male and female portions thereof reversed.

Figure 38:
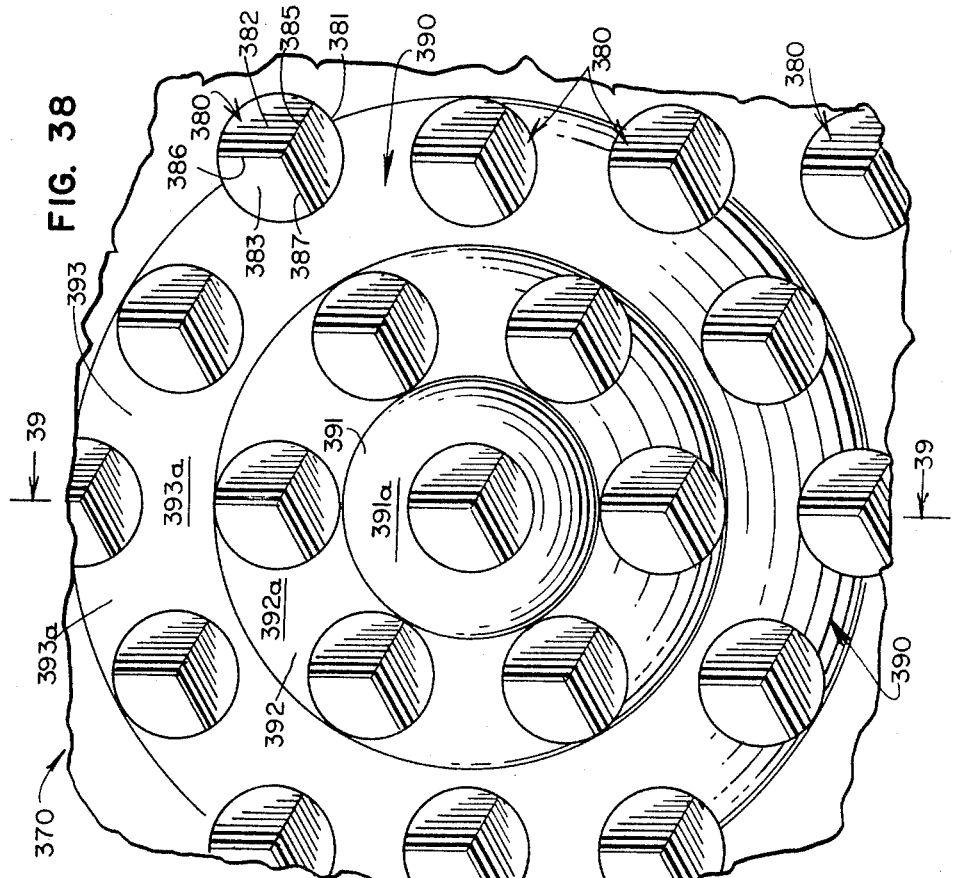
FIG. 38 is an elevational view of a portion of the master tool against which the mold of FIGS. 36 and 37 was formed.
Figure 39:
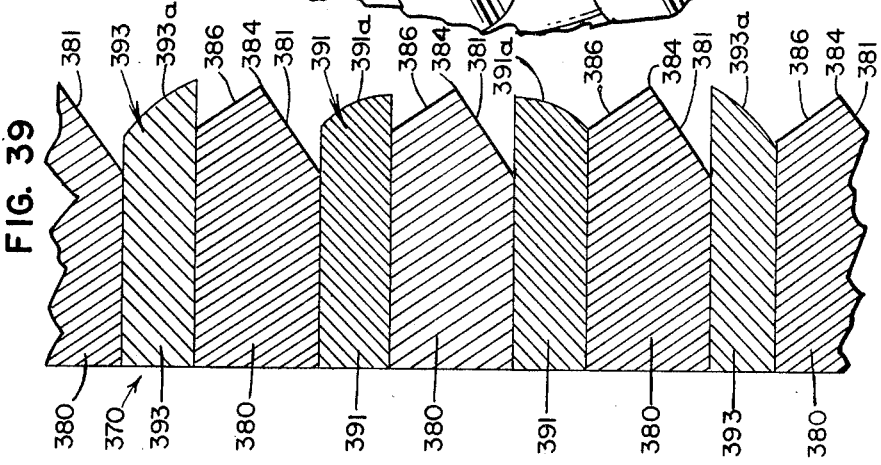
FIG. 39 is a view in vertical section through the master tool of FIG. 38 along the line 39—39 thereof.

There is illustrated in FIGS. 38 and 39 a portion of the master tool from which is molded the mold of FIGS. 36 and 37 to form the rear face 332 of the lens 330 illustrated in FIG. 35, the master tool in FIGS. 38 and 39 being designated by the numeral 370. The master tool 370 is formed of a plurality of concentric metal rings 390 that completely fill the area of the master tool 370 and a plurality of metal reflector forming pins 380 distributed throughout the rings 390, the preferred metal for the pins 380 and the rings 390 being stainless steel. Referring first to the reflector pins 380 which are best illustrated in FIGS. 40 to 43, inclusive, it will be seen that each of the pins 380 includes an elongated shank 380a that is circular in cross section, the upper end of the pin 380 being shaped to provide areas 381, 382 and 383 which are used to form the portions of the mold 330' against which are molded respectively the reflector surfaces 341, 342 and 343. The pin surfaces 381, 382 and 383 are all disposed mutually perpendicular to each other and are joined at the cube corner or peak 384 and along the upper edges 385, 386 and 387.

The concentric metal rings 390 carry on the forward or upper ends thereof dioptric ring forming surfaces corresponding to the dioptric surfaces on the lens 330 explained above. For example, the innermost ring 391 has a surface 391a therein, the second ring 392 has a dioptric forming surface 392a thereon, the third ring 393 has a dioptric forming surface 393a thereon, etc., until a sufficient number of the dioptric rings 390 have been provided completely to fill the area of the master tool 370.

In forming the master tool 370, an assembly of the concentric rings 390 is first provided, sufficient rings being present in the assembly completely to fill the area of the master tool 370. A plurality of holes is then drilled through the concentric ring assembly, after which one of the pins 380 is inserted in each of the holes thus formed. A suitable clamping structure (not shown) is then provided to hold the concentric rings 390 and the pins 380 in the positions illustrated in FIGS. 38 and 39. The mold 330' is formed from the master tool 370 by the electroforming process described above in detail with respect to the mold 130', and in the interest of brevity, the details of the electroforming process will not be here repeated. After the resultant mold 330' has been stripped from the master tool 370 and the rear surface thereof machined if necessary to fit a mold mounting, the lens 330 can be molded therefrom in the usual manner.

In the form of the invention illustrated in FIGS. 1 to 19 of the drawings, it will be understood that other optic elements may be provided in place of the optic elements 150 described therein, which other optic elements may be cylindrical, cross cylindrical, concave, convex, or combinations thereof. Likewise, with respect to the form of the invention illustrated in FIGS. 1 to 19, it will be understood that other collimating members may be used in place of the collimating lens of 110 illustrated therein, and more specifically, a parabolic reflecting surface could be utilized disposed behind the source of light 117.

With respect to the two forms of the invention illustrated in FIGS. 20 through 43 of the drawings, it will be understood that other optic systems may be used in place of the concentric ring systems therein illustrated, and specifically other forms of dioptric optical systems, or catadioptric optic systems or combinations thereof, may be utilized; for further details of dioptric-catadioptric optic systems of the type illustrated, reference may be had to United States Letters Patent No. 2,831,394, granted April 22, 1958 to Sidney A. Heenan and Robert I. Nagel.

Although none of the clamping assemblies used in holding the parts of the various master tools 170, 270 and 370 have been illustrated in detail, it is to be understood that such clamping assemblies used heretofore in the art are generally useful herein and reference is made to United States Letters Patent No. 1,807,350, granted May 26, 1931 to Jonathan Cass Stimson for details of a suitable clamping assembly.

Furthermore, other methods may be utilized of duplicating lenses from the master tools 170, 270 and 370 illustrated, and other methods may be utilized of duplicating the lenses from molds 130', 230' and 330' illustrated. More specifically, other suitable methods and procedures may be utilized to form molds from the master tools, the electroforming method described being illustrative of these suitable methods and procedures.

From the above it will be seen that there has been provided improved lenses, improved light assemblies incorporating the lenses therein, improved molds and improved master tools for forming the molds and improved molding methods for the forming lenses. More specifically, there have been provided improved lenses including an optic system area and a plurality of retrodirective reflector areas that are superimposed and congruent and which present the same shape and geometric configuration to the eye when viewed in daylight, when illuminated at night by incident light reflected therefrom, and when illuminated at night by transmitted light from a source to the rear thereof. More specifically, the lenses include an optic system area and a reflector area that are superimposed and congruent, wherein the congruent area presents to the eye of an observer the same shape both when lighted by light falling on the front face thereof and when lighted by light falling on the rear face thereof. Furthermore, in the lenses the reflector elements are substantially uniformly distributed throughout the optic system in the congruent area, each of the reflector elements as viewed in the front face of the lens having the major dimension thereof no greater than about 0.175 inch and being spaced from the adjacent reflector areas a distance no greater than about 0.175 inch, whereby the congruent area when viewed from a distance of about 50 feet appears uniformly lighted throughout and of the same shape both when lighted by light falling on the front face thereof and when lighted by light falling on the rear face thereof. Finally, improved master tools and improved molds and improved methods of making master tools and molds have been provided to form lenses of the type set forth.

While there have been described what are at present considered to be certain preferred embodiments of the invention, it will be understood that various modifications may be made therein, and it is intended to cover in the appended claims all such modifications as fall within the true spirit and scope of the invention.

What is claimed is:

1. A lens for transmitting therethrough and focusing light falling upon one face thereof to direct the light into a predetermined pattern and for reflecting therefrom light falling upon the other face thereof to reflect the light back toward the source thereof, said lens comprising a body of transparent material having a front face and a rear face, a light focusing optic system on said body and substantially covering a predetermined area thereof, said optic system transmitting through said lens and focusing light falling upon said rear face for directing the light into a predetermined pattern, and a plurality of retrodirective reflector elements on said body and substantially uniformly distributed through said optic system in said predetermined area and substantially surrounded thereby, said reflector elements reflecting from said lens light falling upon said front face in said predetermined area for reflecting the light back toward the source thereof, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

2. The lens set forth in claim 1, wherein said optic system and said reflector elements are on the rear face of said body of transparent material.

3. The lens set forth in claim 1, wherein said reflector elements are of the cube corner type.

4. The lens set forth in claim 1, wherein said transparent material is a synthetic organic resin.

5. A lens for transmitting therethrough and focusing light falling upon one face thereof to direct the light into a predetermined pattern and for reflecting therefrom light falling upon the other face thereof to reflect the light back toward the source thereof, said lense comprising a body of transparent material having a front face and a rear face, a light focusing optic system on said body and substantially covering a predetermined area thereof, said optic system transmitting through said lens and focusing light falling upon said rear face for directing the light into a predetermined pattern, and a plurality of substantially full cube corner retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, adjacent ones of said reflector elements as viewed in said front space being spaced apart a distance no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

6. A lens for transmitting therethrough and focussing light falling upon one face thereof to direct the light into a predetermined pattern and for reflecting therefrom light falling upon the other face thereof to reflect the light back toward the source thereof, said lens comprising a body of transparent material having a front face and a rear face, a light focusing optic system on said body and substantially covering a predetermined area thereof, said optic system transmitting through said lens and focussing light falling upon said rear face for directing the light into a predetermined pattern, and a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, approximately one-half of said predetermined area being covered by said optic system and approximately one-half of said predetermined area being covered by said reflector elements, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

7. A lens for transmitting therethrough and focussing light falling upon one face thereof to direct the light into a predetermined pattern and for reflecting therefrom light falling upon the other face thereof to reflect the light back toward the source thereof, said lens comprising a body of transparent material having a front face and a rear face, a light focusing optic system on said body and substantially covering a predetermined area thereof, said optic system transmitting through said lens and focusing light falling upon said rear face for directing the light into a predetermined pattern, and a plurality of substantially full cube corner retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, approximately one-half of said predetermined area being covered by said optic system and approximately one-half of said predetermined area being covered by said reflector elements, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

8. A lens for transmitting therethrough and focusing light falling upon one face thereof to direct the light into a predetermined pattern and for reflecting therefrom light falling upon the other face thereof to reflect the light back toward the source thereof, said lens comprising a body of transparent material having a front face and a rear face, a light focusing optic system on said body and substantially covering a predetermined area thereof, said optic system transmitting through said lens and focusing light falling upon said rear face for directing the light into a predetermined pattern, and a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, said predetermined area being composed of a plurality of juxtaposed areas of regular geometric shape as viewed in a direction substantially normal to said faces, certain of said areas of regular geometric shape combining to form said optic system and the other of said areas of regular geometric shape forming said reflector elements, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

9. The lens set forth in claim 8, wherein said areas of regular geometric shape have a hexagonal shape.

10. A lens for transmitting therethrough and focusing light falling upon one face thereof to direct the light into a predetermined pattern and for reflecting therefrom light falling upon the other face thereof to reflect the light back toward the source thereof, said lens comprising a body of transparent material having a front face and a rear face, a light focusing optic system of a regular geometric pattern on said body and substantially covering a predetermined area thereof, said optic system transmitting through said lens and focusing light falling upon said rear face for directing the light into a predetermined pattern, and a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

11. A lens for transmitting therethrough and focusing light falling upon one face thereof to direct the light into a predetermined pattern and for reflecting therefrom light falling upon the other face thereof to reflect the light back toward the source thereof, said lens comprising a body of transparent material having a front face and a rear face, a concentric ring optic system on said body and substantially covering a predetermined area thereof, said optic system transmitting through said lens and focusing light falling upon said rear face for directing the light into a predetermined pattern, and a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

12. The lens set forth in claim 11, wherein said concentric ring optic system is a dioptric optic system.

13. A lens for transmitting therethrough and focusing light falling upon one face thereof to direct the light into a predetermined pattern and for reflecting therefrom light falling upon the other face thereof to reflect the light back toward the source thereof, said lens comprising a body of transparent material having a front face and a rear face, a light focusing optic system of a regular geometric pattern on said body and substantially covering a predetermined area thereof, said optic system transmitting through said lens and focusing light falling upon said rear face for directing the light into a predetermined pattern, and a plurality of substantially full cube corner retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

14. A lens for transmitting therethrough and focusing light falling upon one face thereof to direct the light into a predetermined pattern and for reflecting therefrom light falling upon the other face thereof to reflect the light back toward the source thereof, said lens comprising a body of transparent material having a front face and a rear face, a light focusing optic system of a regular geometric pattern on said body and substantially covering a predetermined area thereof, said optic system transmitting through said lens and focusing light falling upon said rear face for directing the light into a predetermined pattern, and a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, said predetermined area being composed of a plurality of juxtaposed areas of regular geometric shape as viewed in a direction substantially normal to said faces, certain of said areas of regular geometric shape combining to form said optic system of regular geometric pattern and the other of said areas of regular geometric shape forming said reflector elements, adjacent ones of said reflector elements as viewed in said front face being spaced apart a distnce no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

15. The lens set forth in claim 14, wherein said areas of regular geometric shape have a hexagonal shape.

16. A lens for transmitting therethrough and focusing light falling upon one face thereof to direct the light into a predetermined pattern and for reflecting therefrom light falling upon the other face thereof to reflect the light back toward the source thereof, said lens comprising a body of transparent material having a front face and a rear face, a light focusing optic system of a regular geometric pattern on said body and substantially covering a predetermined area thereof, said optic system transmitting through said lens and focusing light falling upon said rear face for directing the light into a predetermined pattern, and a plurality of retrodirective reflector elements on said body and substantially uniformly distributed throughout said optic system in said predetermined area and substantially surrounded thereby, said reflector elements being circular in shape as viewed in a direction substantially normal to said faces and reflecting from said lens light falling upon said front face in said predetermined area for reflecting the light back toward the source thereof, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light falling upon the rear face thereof and when lighted by light falling upon the front face thereof.

17. A light assembly comprising a housing, a light source mounted in said housing, a lens mounted on said housing and spaced from said light source, said lens including a body of transparent material having a front face and a rear face disposed toward said light source, a light focusing optic system on said body and substantially covering a predetermined area thereof, said optic system transmitting through said lens and focusing light from said light source for directing the light into a predetermined pattern, a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light from said light source falling on the rear face thereof and when lighted by light falling upon the front face thereof.

18. A light assembly comprising a housing, a light source mounted in said housing, a lens mounted on said housing and spaced from said light source, a light collimating member in said housing for directing the light from said light source into essentially parallel rays and upon the adjacent face of said lens, said lens including a body of transparent material having a front face and a rear face disposed toward said collimating member, a light focusing optic system on said body and substantially covering a predetermined area thereof, said optic system transmitting through said lens and focusing light from said collimating member for directing the light into a predetermined pattern, a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, said predetermined area being composed of a plurality of juxtaposed areas of regular geometric shape as viewed in a direction substantially normal to said faces, certain of said areas of regular geometric shape combining to form said optic system and the other of said areas of regular geometric shape forming said reflector elements, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light from said collimating member falling on the rear face thereof and when lighted by light falling upon the front face thereof.

19. The light assembly set forth in claim 18, wherein said light collimating member is a second lens disposed between said light source and said first mentioned lens.

20. A light assembly comprising a housing, a light source mounted in said housing, a lens mounted on said housing and spaced from said light source, said lens including a body of transparent material having a front face and a rear face disposed toward said light source, a light focusing optic system of a regular geometric pattern on said body and substantially covering the predetermined area thereof, said optic system transmitting through said lens and focusing light from said light source for directing the light into a predetermined pattern, a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light from said light source falling on the rear face thereof and when lighted by light falling upon the front face thereof.

21. A light assembly comprising a housing, a light source mounted in said housing, a lens mounted on said housing and spaced from said light source, said lens including a body of transparent material having a front face and a rear face disposed toward said light source, a light focusing dioptric optic system on said body and substantially covering a predetermined area thereof, said optic system transmitting through said lens and focusing light from said light source for directing the light into a predetermined pattern, a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light from said light source falling on the rear face thereof and when lighted by light falling upon the front face thereof.

22. A light assembly comprising a housing, a light source mounted in said housing, a lens mounted on said housing and spaced from said light source, said lens including a body of transparent material having a front face and a rear face disposed toward said light source, a light focusing optic system of a regular geometric pattern on said body and substantially covering the predetermined area thereof, said optic system transmitting through said lens and focusing light from said light source for directing the light into a predetermined pattern, a plurality of retrodirective reflector elements on said body and substantially uniformly distributed throughout said optic system in said predetermined area and substantially surrounded thereby, said reflector elements reflecting from said lens light falling upon said front face in said predetermined area for reflecting the light back toward the source thereof, said predetermined area being composed of a plurality of juxtaposed areas of regular geometric shape as viewed in a direction substantially normal to said faces, certain of said areas of regular geometric shape combining to form said optic system of regular geometric pattern and the other of said areas of regular geometric shape forming said reflector elements, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light from said light source falling on the rear face thereof and when lighted by light falling upon the front face thereof.

23. A light assembly comprising a housing, a light source mounted in said housing, a lens mounted on said housing and spaced from said light source, said lens including a body of transparent material having a front face and a rear face disposed toward said light source, a light focusing optic system of a regular geometric pattern on said body and substantially covering the predetermined area thereof, said optic system transmitting through said lens and focusing light from said light source for directing the light into a predetermined pattern, a plurality of retrodirective reflector elements on said body and substantially uniformly distributed throughout said optic system in said predetermined area and substantially surrounded thereby, said reflector elements being circular in shape as viewed in a direction substantially normal to said faces and reflecting from said lens light falling upon said front faces in said predetermined area for reflecting the light back toward the source thereof, adjacent ones of said reflector elements as viewed in said front face being spaced apart a distance no greater than about 0.175 inch, whereby when said predetermined area is viewed in said front face of said lens at a distance of about 50 feet it appears uniformly lighted throughout and of the same shape both when lighted by light from said light source falling on the rear face thereof and when lighted by light falling upon the front face thereof.

References Cited by the Examiner

UNITED STATES PATENTS

| | | | |
|---|---|---|---|
| 1,874,138 | 8/1932 | Stimson | 240—8.3 X |
| 2,003,804 | 6/1935 | Falge | 240—8.3 |
| 2,075,367 | 3/1937 | Smithburn | 240—41.3 |
| 2,306,732 | 12/1942 | Huxham | 18—44 |
| 2,308,100 | 1/1943 | Onksen et al. | 240—41.3 |
| 2,315,721 | 4/1943 | Martin | 18—44 |
| 2,464,738 | 3/1949 | White et al. | 264—1 |
| 2,473,588 | 6/1949 | Johnson | 264—1 |
| 2,682,807 | 7/1954 | Onksen | 88—82 |
| 2,818,500 | 12/1957 | Franck | 240—106 |
| 2,907,249 | 10/1959 | Hjermstad | 88—82 X |
| 3,001,062 | 9/1961 | Winkler et al. | 240—106 |

NORTON ANSHER, *Primary Examiner.*

C. C. LOGAN, *Assistant Examiner.*